(12) United States Patent
Allen, Jr. et al.

(10) Patent No.: US 6,868,082 B1
(45) Date of Patent: Mar. 15, 2005

(54) NETWORK PROCESSOR INTERFACE FOR BUILDING SCALABLE SWITCHING SYSTEMS

(75) Inventors: James Johnson Allen, Jr., Raleigh, NC (US); Brian Mitchell Bass, Apex, NC (US); Jean Louis Calvignac, Cary, NC (US); Santosh Prasad Gaur, Raleigh, NC (US); Marco C. Heddes, Raleigh, NC (US); Michael Steven Siegel, Raleigh, NC (US); Fabrice Jean Verplanken, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/385,603

(22) Filed: Aug. 30, 1999

(51) Int. Cl.$^7$ .......................... H04L 12/28; G06F 13/28
(52) U.S. Cl. ...................... 370/360; 711/170; 710/20; 710/28
(58) Field of Search .............................. 370/360, 361, 370/362, 363, 364, 365, 387, 389, 391, 395.4, 395.5, 395.71; 710/28, 29, 30, 116, 126, 129, 131; 711/149, 153, 170; 340/825.51

(56) References Cited

U.S. PATENT DOCUMENTS

| | | | |
|---|---|---|---|
| 4,471,456 A | * | 9/1984 | Branigin et al. |
| 5,008,878 A | | 4/1991 | Ahmadi et al. |
| 5,305,317 A | * | 4/1994 | Szczepanek |
| 5,586,263 A | * | 12/1996 | Katsumata et al. |
| 5,706,278 A | * | 1/1998 | Robillard et al. |
| 5,724,348 A | | 3/1998 | Basso et al. |
| 5,787,430 A | | 7/1998 | Doeringer et al. |
| 5,857,087 A | * | 1/1999 | Bemanian et al. |
| 6,061,754 A | * | 5/2000 | Cepulis |
| 6,259,699 B1 | * | 7/2001 | Opalka et al. |
| 6,260,073 B1 | * | 7/2001 | Walker et al. |
| 6,404,975 B1 | * | 6/2002 | Bopardikar et al. |

* cited by examiner

*Primary Examiner*—Afsar Qureshi
(74) *Attorney, Agent, or Firm*—Joscelyn G. Cockburn

(57) ABSTRACT

A network apparatus comprising storage units storing configuration information about the network apparatus, an input network interface to at least one network physical line, at least one processor receiving network data from said network interface, processing said data, storing information about said network data in said storage units, storing said data as formatted data units in said storage units, a first bus interface to two bus connections, a first hardware component reading said configuration information and said information about data stored in said storing units and steering said formatted data units stored in said storage units to at least one of the two bus connections of said first bus interface, a second bus interface to two bus connections, an output network interface to at least one network physical line, a second hardware component reading formatted data units arriving on at least one of the two bus connections of said second bus interface and storing said formatted data units in said storage units, said at least one processor reading said formatted data units from said storage units, processing them and sending them as network data to at least one network physical line through said output network interface. On the basis of this network processor, it is possible to build switching systems by adding one network processor and at least one switch; it is also possible to build double density blades attached to two redundant switch fabrics which can also be accessed concurrently.

18 Claims, 19 Drawing Sheets

NETWORK PROCESSOR INTERFACE FOR BUILDING SCALABLE SWITCHING SYSTEMS

RELATED APPLICATIONS

The interested reader is referred, for assistance in understanding the inventions here described, to the following prior disclosures which are relevant to the description which follows and each of which is hereby incorporated by reference into this description as fully as if here repeated in full:

U.S. Pat. No. 5,008,878 issued 16 Apr. 1991 for High Speed Modular Switching Apparatus for Circuit and Packet Switched Traffic;

U.S. Pat. No. 5,724,348 issued 3 Mar. 1998 for Efficient Hardware/Software Interface for a Data Switch;

U.S. Pat. No. 5,787,430, issued 28 Jul. 1998 for Variable Length Data Sequence Back Tracking and Tree Structure;

U.S. patent application Ser. No. 09/312,148 filed May 14, 1999, and entitled "System Method and Computer Program for Filtering Using Tree Structure"; and U.S. patent application Ser. No. 09/330,968 filed 11 Jun. 1999 and entitled "High Speed Parallel/Serial Link for Data Communication".

TECHNICAL FIELD

The present invention relates to network processors used in switching systems forming the switched networks such as Internet networks; more particularly, the present invention relates to network processor attachment capabilities for enabling a large number of different switching system configurations including at least one network processor and none or at least one switching fabric.

BACKGROUND

In network switching systems, switching fabrics and network processors are interconnected to support the media speed data stream of the network links in up and down directions. The up-network processor receives the network data flow from its input ports to the network links, identifies and process the data units and send them as an internal data flow to an internal address of the switching system. This internal address can be a switching fabric or one other component of the switching system. The down-network processor receives the internal data flow, processes this data flow and send it as network data units to its output ports to the network links. In the split of tasks characterizing the switching systems, the network processor is responsible for supporting the different network protocols such as ATM, IP, IPX, Packet Over SONET, Ethernet and Frame Relay.

The race to the best cost/performance ratio leads the network component manufacturers to have the most scalable and flexible switching systems. An ideal flexible and scalable switching system starts from the minimum set of functions and hardware for control and switching; ideally, this minimal configuration should be upgradable to a highly sophisticated switching system having, in terms of control ISO Layer 2 to 7 implemented, and in terms of switching capacities a high throughput. In a traditional switching box configuration including switching blades and network interface blades, the price per port is lower if the user can limit the number of network interface blades; high density network interface blades, and thus network processors, should increase their density.

The scalable Rapacity in a network switching system may depend on the scalable capacity of the switch fabric itself; the IBM/Es scalable switching technology is based today on PRIZMA switch, more particularly the recently available PRIZMA-E which provides the port expansion function. At the time of this writing, further information is available at: http://www.zurich.ibm.com/Technology/ATM/SWOCPWP/WWW.

The scalable capacity in a network switching system may depend on the scalable capacity of the network processor, independently of the switching fabric. As an illustration of the independence expected for the network processor is the fact that it should be able to interface any switching fabric using, for instance, the emerging standardized interface, CSIX. The network processor should provide a scalable density independently to the scalable capacity of the switch fabric itself When the network processor increases its density, providing more and more network ports, the switch is only required to sustain the increasing throughput. Furthermore, some switching configurations could even not involve a switch fabric but only interconnected network processors. On the other side, in a large switching system, the number of switching fabrics should be increased for improving the switched throughput or for bringing reliability in redundant switching configurations.

All these requirements on the switching systems implies that the up-interface of network processors be able to sustain all types of configurations which cannot be found in the network components manufacturer industry today.

SUMMARY OF THE INVENTION

Accordingly, the main object of the invention is to provide network processor apparatus, network switching boxes and systems to build configurations able to support scalable capacity in terms of number of network ports, of switching throughput and of switching redundancy.

This object is achieved with network apparatus comprising:—storage units storing configuration information about the network apparatus,—an input network interface to at least one network physical line,—at least one processor receiving network data from said input network interface, processing said data, storing information about said network data in said storage units, storing said data as formatted data units in said storage units,—a first bus interface to two bus connections, a first hardware component reading said configuration information and said information about data stored in said storing units and steering said formatted data units stored in said storage units to at least one of the two bus connections of said first bus interface, a second bus interface to two bus connections, an output network interface to at least one network physical line, a second hardware component reading formatted data units arriving on at least one of the two bus connections of said second bus interface and storing said formatted data units in said storage units, said at least one processor reading said formatted data units from said storage units, processing them and sending them as network data to at least one network physical line through said output network interface.

This network apparatus is further able to have an additional wrap for connecting one of the two bus connections of its second interface to one of the two connections of its first bus interface For providing a double density configuration with two network processors in a standalone configuration or when attached to one or two switches, the network processor further comprises an external wrap between one of the two bus connection of the first or second interface of the first network processor to, respectively, one of the two bus connection of its second or first interface of the second network processor.

The advantage of a double bus connection for each interface and the external or internal wraps is the possibility to have double density configurations with two network processors and, in case of attachment to two switches, the access to the switch can be redundant or concurrent.

The foregoing has outlined rather broadly the features and technical advantages of the present invention in order that the detailed description of the invention that follows may be better understood. Additional, features and advantages of the invention will be described hereafter which form the subject of the claims of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE PREFERRED EMBODIMENT

Figure 1:
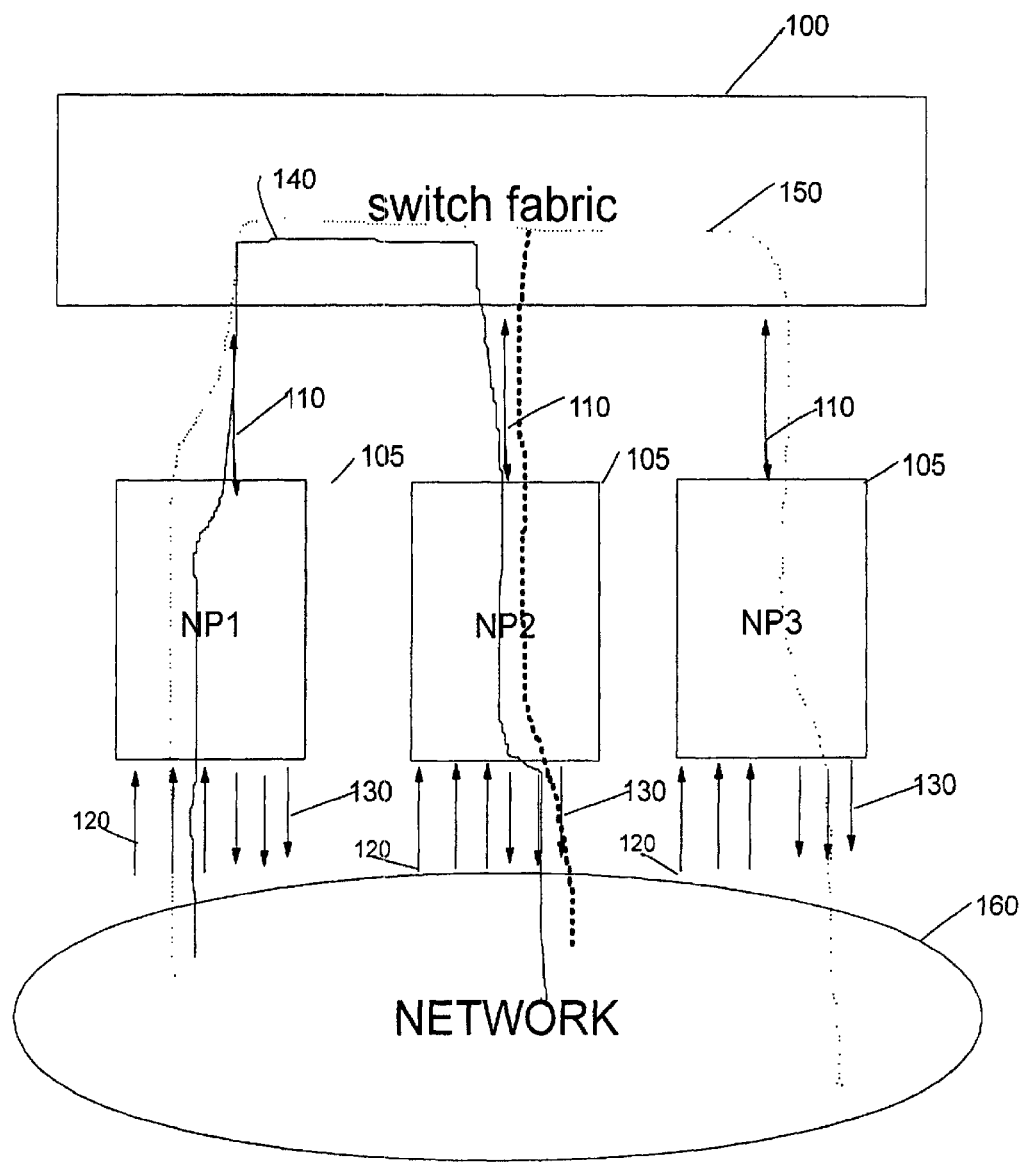
FIG. 1 is a block diagram showing functionally a switching system.

FIG. 1 illustrates a switching system comprising a switching fabric (100) and network processors (105) attached to a network (160). The data flows enter the network processor via the network lines (120). Interfacing physical lines, the network processor is in charge to read, perform controls on input data and deliver the data units read to the switch fabric on its connection bus (110) in a format that the switch is expecting. The network processors are supporting different protocols such as IP, IPX, Ethernet, Packet over SONET, ATM, Frame Relay etc. . . . As an example, the data unit is a frame of variable length for IP protocol. Most of network processors are multiport and multiprotocol. In switch fabrics such as the Prizma switch of IBM, the internal format for the data is a fixed size cell of 64 bytes including an internal header conveying information used for internal routing. The switch fabric of FIG. 1 can connect many network processors; it is fed by the different network processors through the bus connections (110) and its function is to switch the internal data units to the correct network processor at the best throughput. The network processor receives on its connection bus the internal data units sent by the switch fabric, processes the data units and send them in the format required by the network protocol to the network line (130) and through the port corresponding to the network protocol and the destination. In a switching node, the network processors can be mounted on boards or on cards called blades. The blades themselves are connected to the backplane bus. The switching fabric can be mounted on one other blade of the same switching node. As the blades are expensive, it is always desirable to have network processor blades supporting the greatest number of ports as possible.

Figure 2:
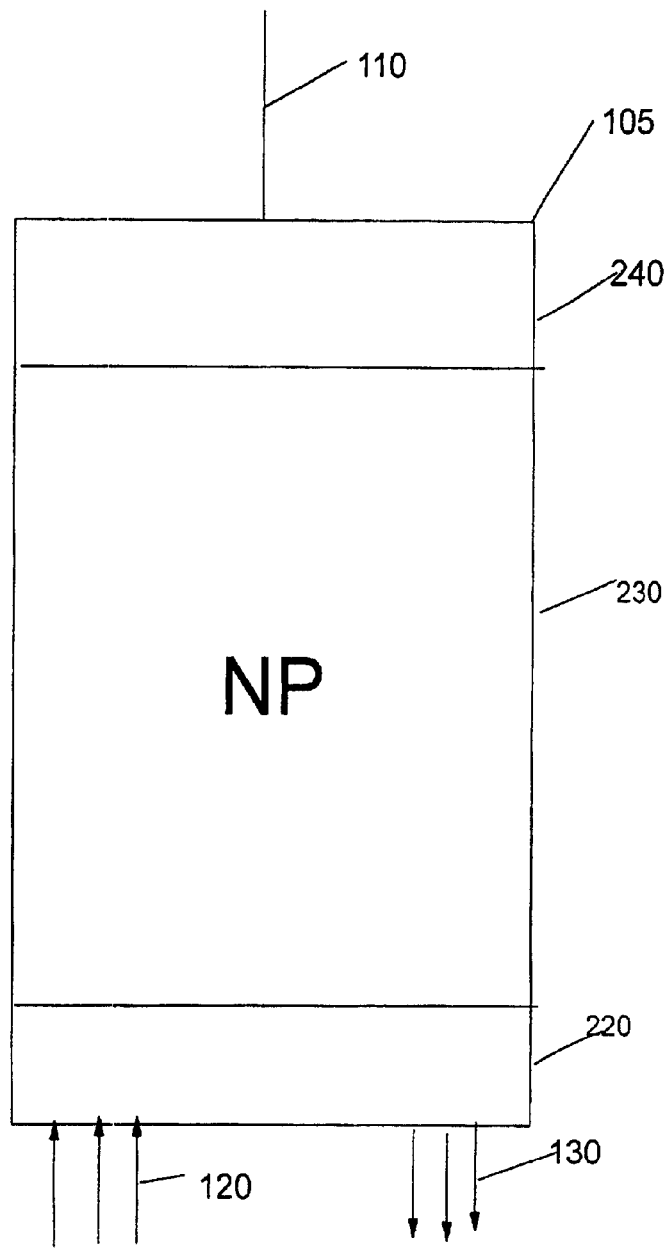
FIG. 2 is a block diagram showing a network processor.

FIG. 2 is a block diagram showing a typical functional structure of a network processor. The network processor is connecting the physical network lines through an interface (220) and is able in the up direction to process data bits providing the error check, decoding etc . . . This interface takes into account each different network protocol. Buffer data bits are stored for the upper layer (230) which will process this data and schedules data units adapted to the switch fabric format for the physical switch interface (240) level. Other processing of data in logical layer (230) depends on the capability of the network processor and is not considered in the present description of the data flow. In the physical switch interface data units are sent onto the connection bus (110) to the switch fabric.

In the down direction, the network processor receives the switched data unit in its physical interface (240). Network data units are prepared in the lower logical layer (230) of the network processor. In the next logical layer (220) data is formatted according to the different network protocols and are sent onto the network lines according to the different physical interfaces.

Figure 3:
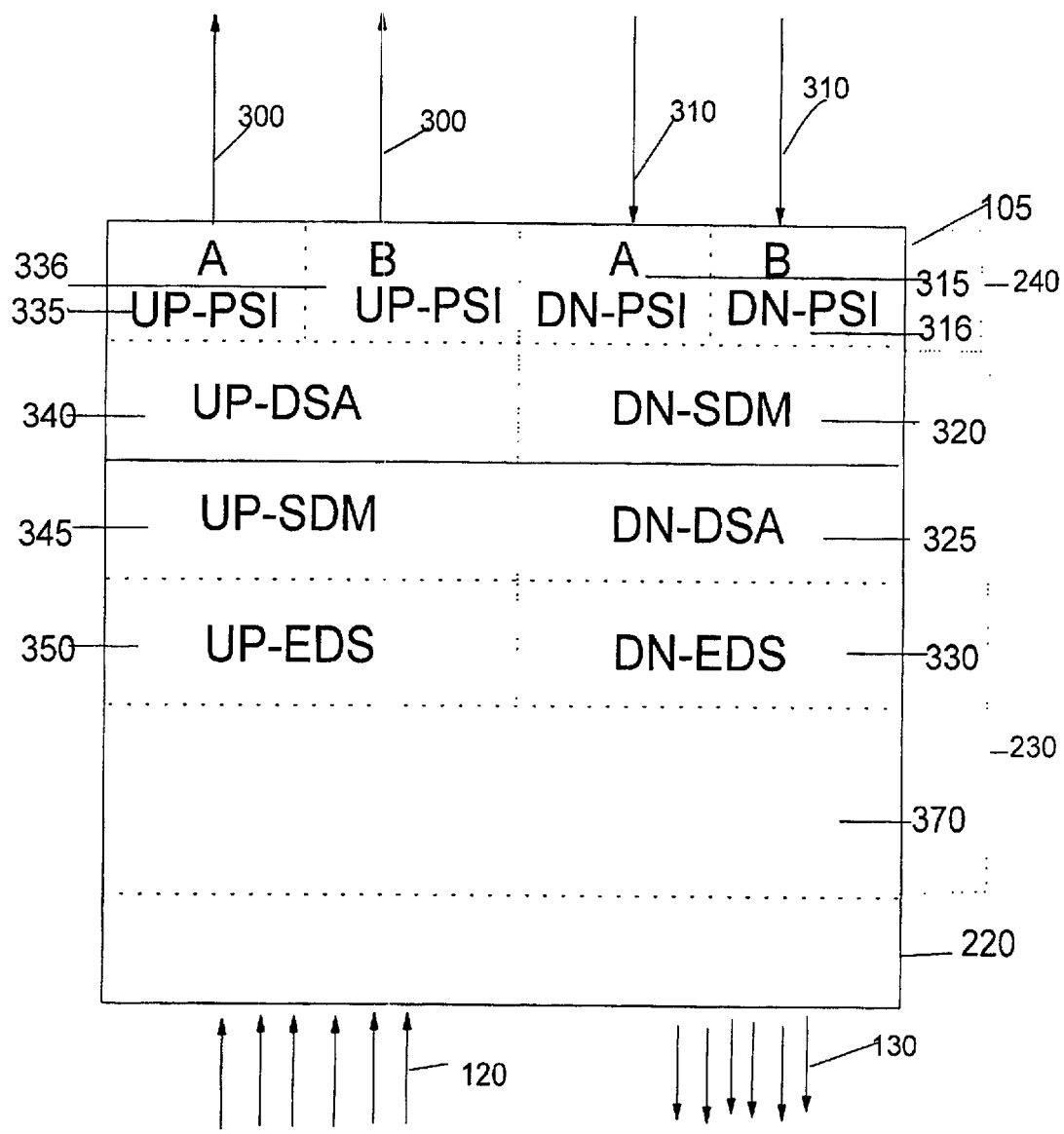
FIG. 3 is a block diagram showing a network processor according to the invention.

FIG. 3 is a block diagram showing the upper logical layers (336, 335, 340, 345, 330, 325, 320, 316, 315) of the network processor (105) as implemented in the preferred embodiment. These layers are split into two logical processing lines: up side processing for incoming data flow and down side processing for outgoing data flow. It is shown in the following that the two sides may communicate. This architecture participates in the flexibility illustrated in the network system configurations described later and allows also to implement efficient dedicated hardware logic to sustain media speed data flow. The two side structure of the logical blocks particularly described in this preferred embodiment does not predetermine the structure of the other layers required in the network processor. As indicated in FIG. 3, 335, 336, 315 and 316 logical blocks represent the 240 layer of a network processor as described in FIG. 2 and the other logical blocks 340, 345, 350, 320, 325 ,330 are participating in the 230 processing layer of a network processor as described in FIG. 2. The other components for the lower layers can have a two side architecture or not. One implementation is to have common storage units, two 220 interfaces and a common set of processors executing the other frame processing in the network processor. The up side (350, 345, 340, 335, 336) of the network processor of FIG. 3 sends data to the switch fabric through two physical switch interfaces: A US-PSI (335) and B UP-PSI(336) using two connection buses (300) to the switch fabric. The down side (315, 316, 320, 325, 330) receives data from two connection buses (310) of the switch fabric [(310)] on two down physical interfaces A DN-PSI (315) and B DN-PSI (316). These doubled connections participate also in the flexibility of all the possible network system configurations as described later.

Figure 18:
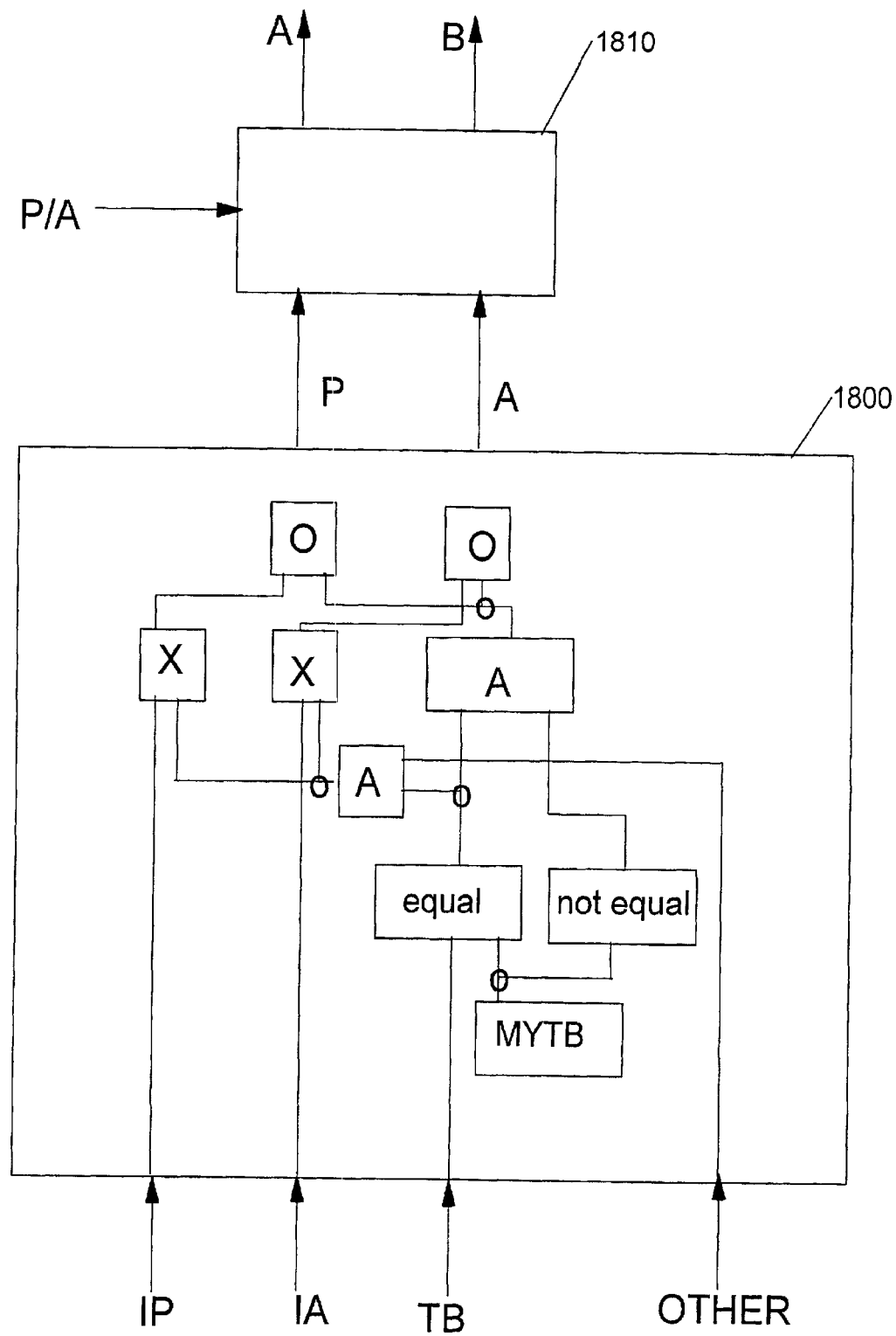
FIG. 18 illustrates a hardware logic of the up side data steering function of the network processor.
Figure 19:
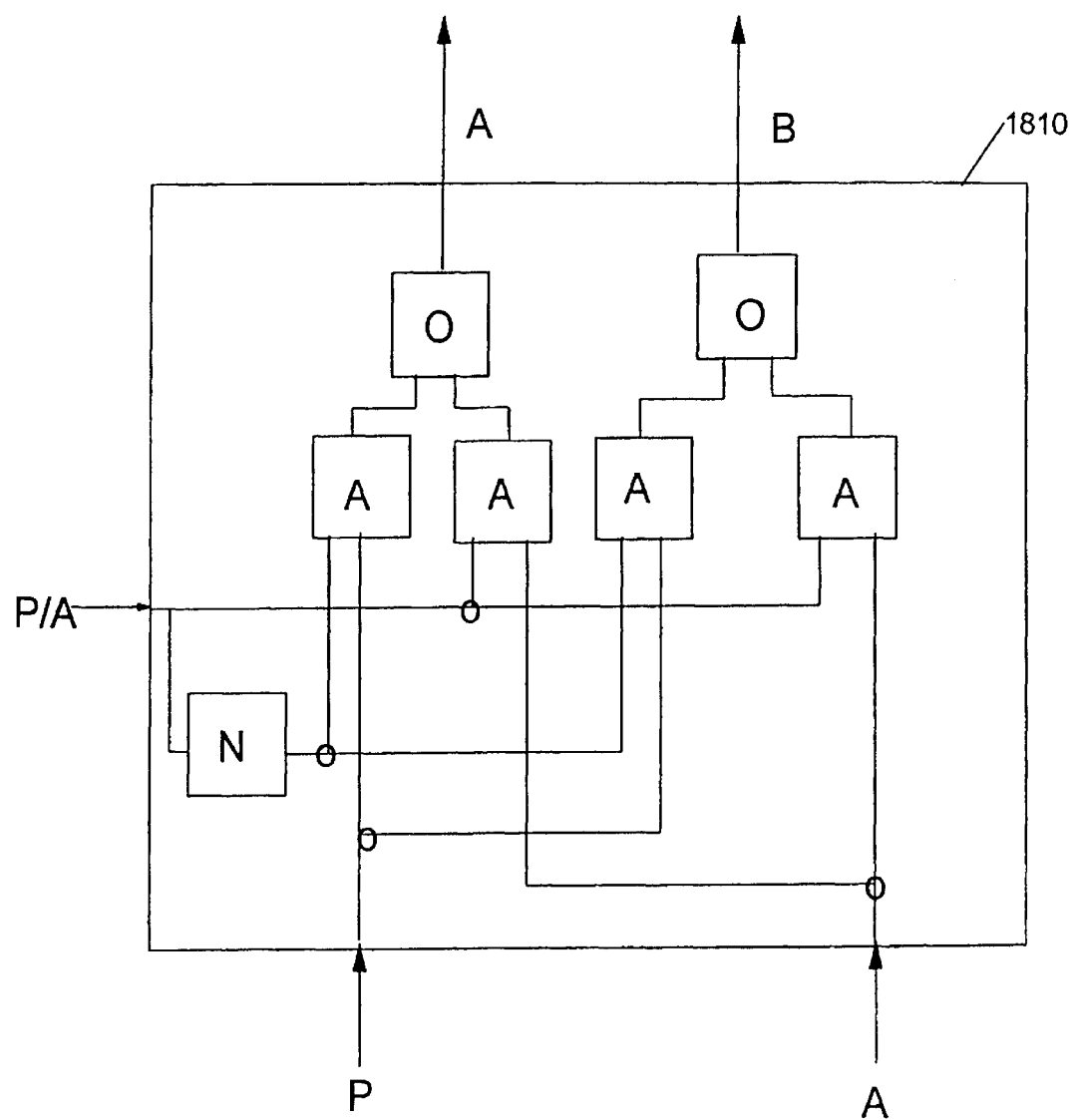
FIG. 19 details one part of the hardware logic of the up side data steering function of the network processor.

The UP-EDS (up enqueue-dequeue scheduler) prepares frames which have been received by the lower layers of the network processor from the network and sends them to the upper layer when there are ready to be sent to the switch fabric. UP-EDS uses storage units of the network processor. The scheduled frames are received by the UP-SDM (up switch data mover) which segments them, formats them into internal fixed length cells as accepted by the switch fabric and sends them to the upper layer. The UP-SDM computes also input parameters (IP,IA,TB,R, MYTB) already stored in the storage unit of the network processor and preferably brought to the UP-SDM via signal wires; these parameters are related to the configuration of the network system to which the network processor is connected to or are related to the destination address to which the frame will be sent. The configuration information is entered in a network processor by the service control point function used for initialing and configuring the network components of a switching system. The UP-SDM provides two parameters to the upper layer (P,A) resulting in the computation of the initial parameters. The upper layer, the UP-DSA (up data steering and arbiter) receives the switch cells from the UP-SDM and will decide where they will be steered: either towards A UP-PSI or towards B UP-PSI. This choice will depend on the value of the two parameters sent by UP-SDM and on the result of a computation it has to perform between these two parameters and another one (P/A) stored also in a storage unit of the network processor. The parameter computing in UP-SDM and in UP-DSA would be advantageously implemented as a hardware logic as illustrated in FIG. 18 and FIG. 19. The parameters are also preferably brought to the UP-DSA and UP SDM via signal wires. The UP-DSA has also to take into account one other switch cell flow which may come, in some configurations, from the down side of the down side processing (315, 316, 320, 325, 330), more precisely, the DN-DSA (down data steering arbiter). Because of these converging incoming switch cell flow, the UP-DSA has to arbiter between these two flows and to steer them to the physical interfaces. The switch cells are sent to the bus physical interface (A UP-PSI or B UP-PSI) according to the steering choice. Serial physical interfaces can be advantageously used.

Conversely, switch cells are received on the A DN-PSI (A down physical interface) and B DN-PSI (B down physical interface). The cells are received by the DN-SDM (down switch data mover) and either steered to the UP-DSA or processed in the lower down layers depending on the result of computation of configuration and destination parameters stored in the storage unit of the network processor. The DN-SDM and DN-DSA are also preferably implemented as hardware logic, the parameters being advantageously brought to the DN-SDM and DN-DSA via signal wires. As for the data flow sent to the down side output network lines, the DN-SDM preprocesses the switch cells and send them with reassembly information to the scheduler DN-EDS which will link the cells into frames and enqueue them for further usage by the lower layers of the network processor using the storage units of the network processor.

Furthermore, the network processor of the preferred embodiment is able to handle multicast traffic. The multicast information has been already analyzed by the lower layers of the network processor. In some configurations of the multicast of traffic arriving at an input port of a network processor or a part of that traffic going either to the down side of the same network processor or to a second network processor being an extension of the first network processor is handled by the first network processor. These two configurations using external wraps are described later in FIG. 4 to FIG. 16. The multicast traffic or part of the traffic going to one other network processor which is not an extension of the first one is duplicated by the switch if the first network processor has an access to the switch. In the following switching system configurations the multicast traffic can be supported by the switch or the network processor or both.

Figure 4A:
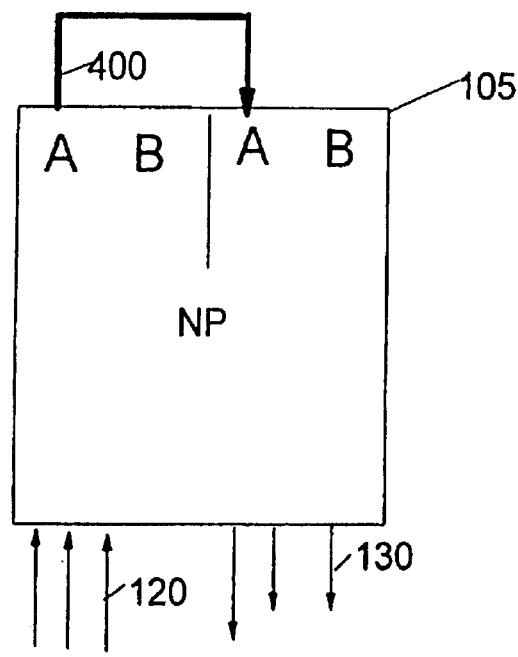
FIG. 4 shows two switching system configurations based on one network processor according to the invention.
Figure 4B:
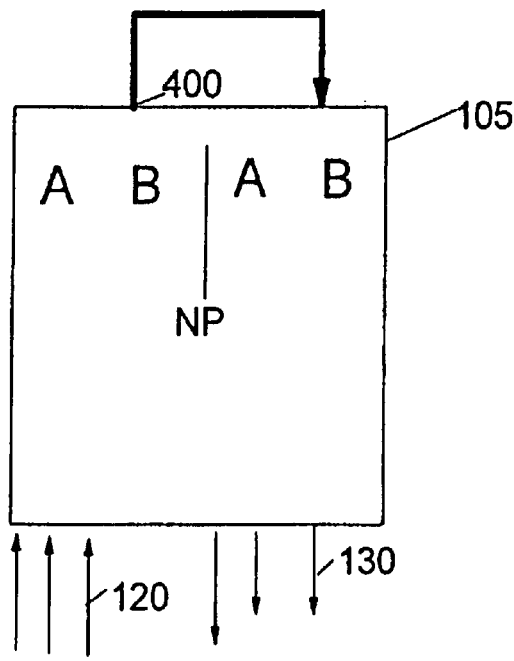

FIG. 4, consisting of FIGS. 4A and 4B, shows two network system configurations, each one being based on one networking processor. Each of these configurations uses an external connection from up side to down side of the same network processor. With these so called external wrap configurations, the data received on one port of a network processor can be rerouted to one other port of the same network processor according to its target address, the network processor acting as a switch itself. One can imagine one network processor on one blade, this blade acting as a low end switch when a limited number of ports is sufficient. The use of an external connection bus from A UP-PSI to A DN-PSI or from A UP-PSI to A DN-PSI means that the same data flow described in FIG. 3 applies as if there were switch connections; switch cells are sent from one side to the other.

Figure 5A:
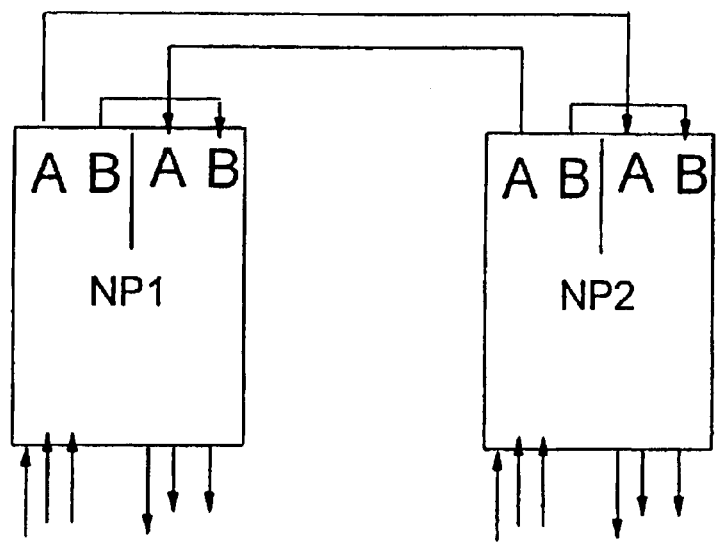
FIG. 5 shows two switching system configurations based on two networking processors according to the invention.
Figure 5B:
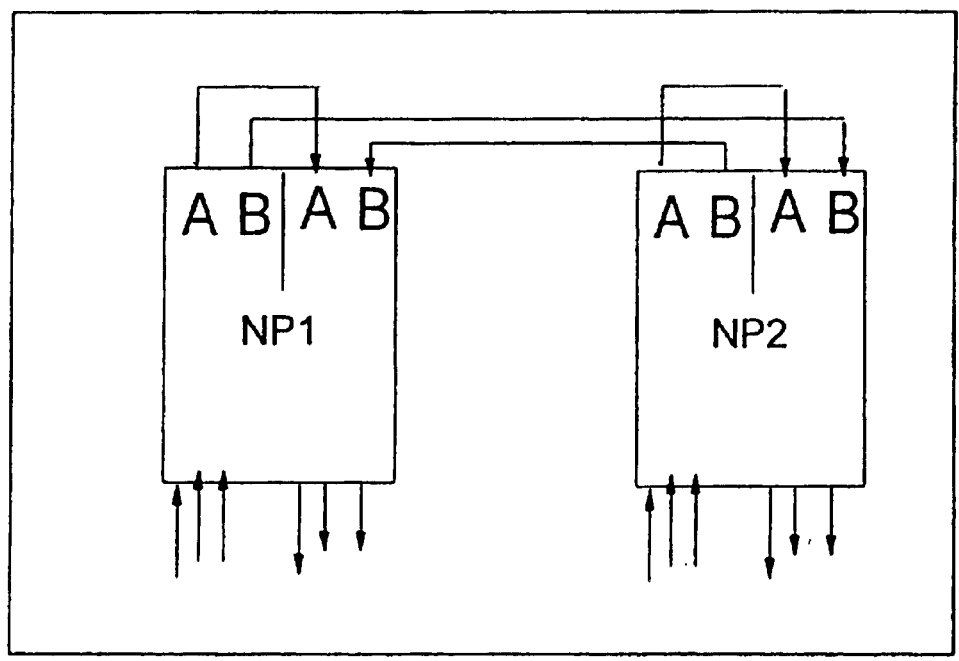

FIG. 5, consisting of FIGS. 5A and 5B, shows a network system configuration based on two network processors without any switch fabric. The communication between the two network processors is done through external connection buses from one up side of one network processor to one down side of one network processor including the same network processor. These external connections include the external wrapping of FIG. 4. In 5A, the external wrapping is performed on B interfaces as in 5B they are performed on A interfaces. In 5B the two network processors are seen as set in a blade. Even if such a blade answers low rate switching needs, this blade has a double switching capacity compared to a blade comprising only one network processor configured as described in FIG. 4.

Figure 6:
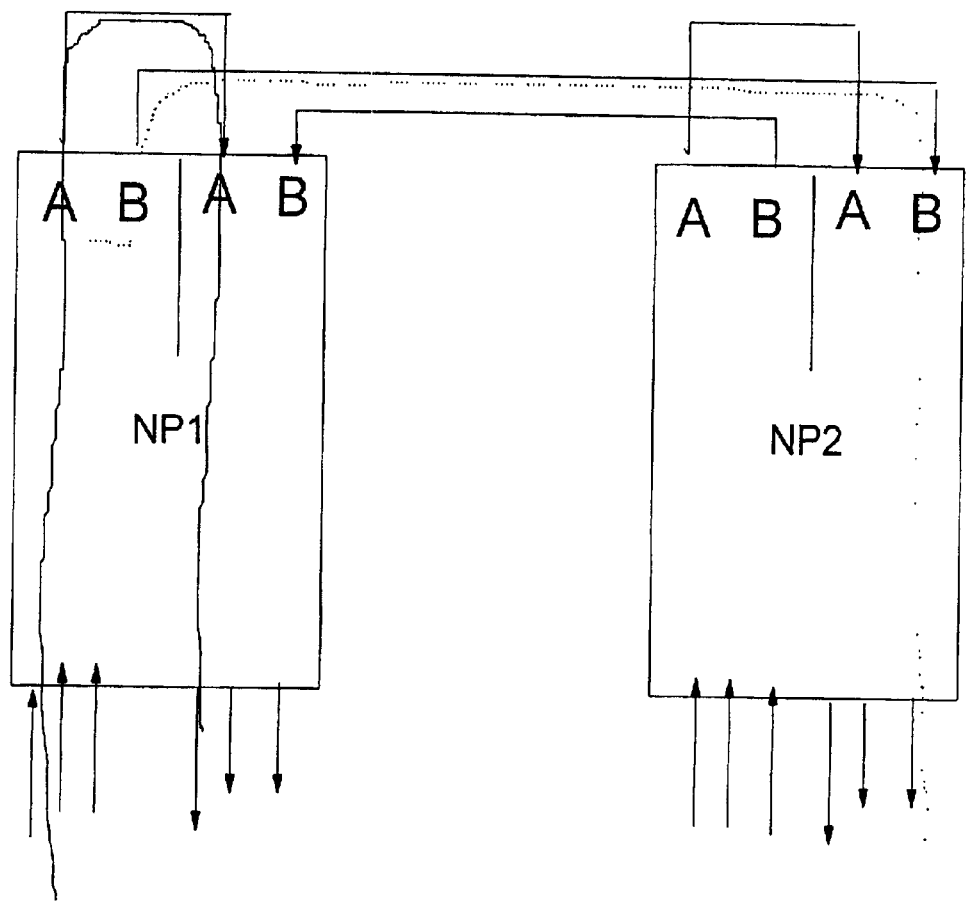
FIG. 6 shows unicast and multicast data flows for the configurations of two network processors of FIG. 5.

FIG. 6 shows how data flow across the dual network processor configurations of FIG. 5, more exactly 5B. A similar data flow can be adapted for 5A. The full line data flow is for unicast traffic received at an input port of NP1: depending on the target destination this traffic will be steered by the A UP-DSA to the A UP-PSI or the B UP-PSI. To reach the down side port of the same network processor, the external wrap is used and UP-DSA will route the traffic to the A DN-PSI of NP1. To reach the down side port of the second network processor, the B NP1 to B NP2 external bus is used: this data flow is represented with a doted line. This case is for unicast traffic. For a multicast traffic to be send to output ports belonging to the two network processor, the A UP-DSA decides to duplicate the traffic on the two ways just decribed. For traffic entering the up side of the second Network processor (NP2) and going to a port of its own down side will use the external wrap from A UP-PSI to A DN-PSI. For traffic entering the up side of the second Network processor (NP2) and going to a port of the down side of the first network processor (NP1) will use the NP2 B UP-PSI to NP1 B DN-PSI bus connection. Similarly these two ways will be used for a simultaneous duplicate traffic data flow if it is a multicast traffic.

Figure 7:
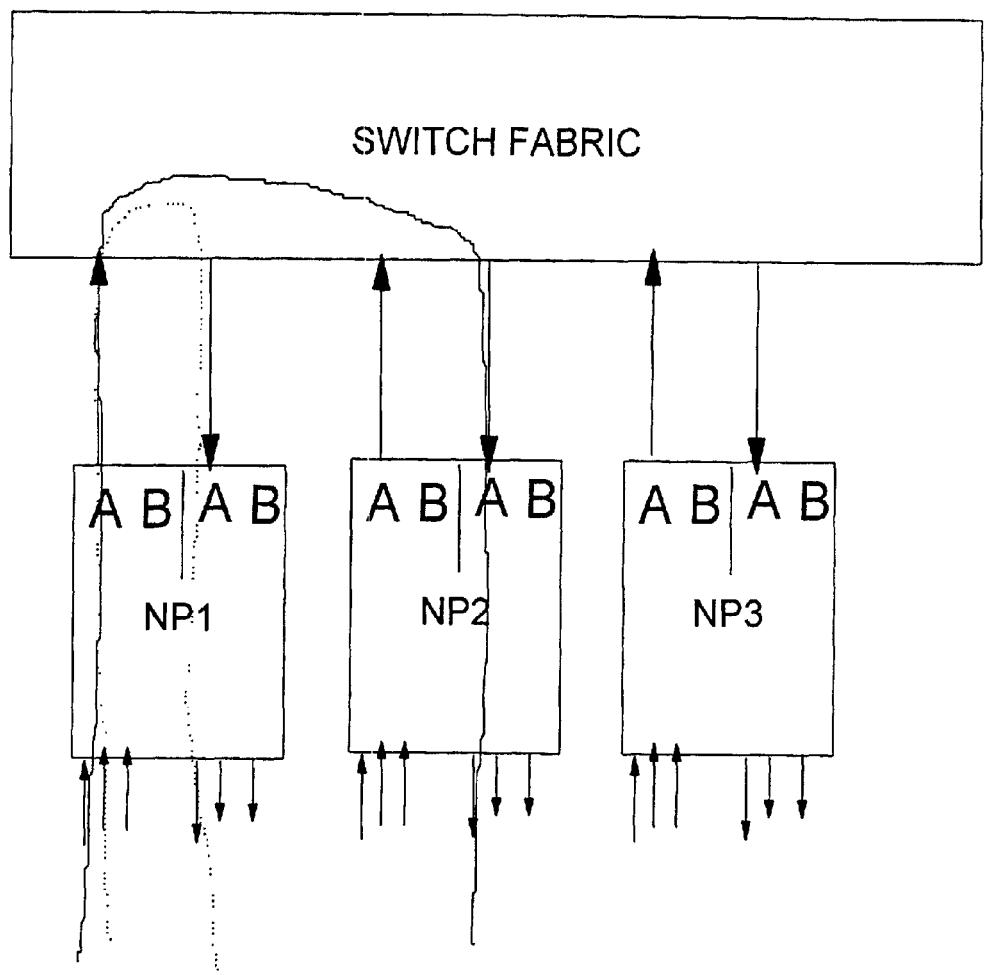
FIG. 7 shows a switching system configuration including a single switch fabric and networking processors according to the invention.

In FIG. 7 the switching system comprises one switching fabric with network processors connected. One network processor can be implemented per blade. Each network processor has its A up and down interfaces connected to the switch bus. Conversely, a symmetrical configuration would be with each network processor having its B interfaces connected to the switch bus. Any incoming traffic on a up side of a network processor is switched via the switched fabric to the correct down side of an network processor attached. The full line represents a unicast traffic flow which comes from one input port of one network processor and which is switched to one down port of one other network processor. The dotted line is the data flow which is switched to the output port of the same network processor.

Figure 8:
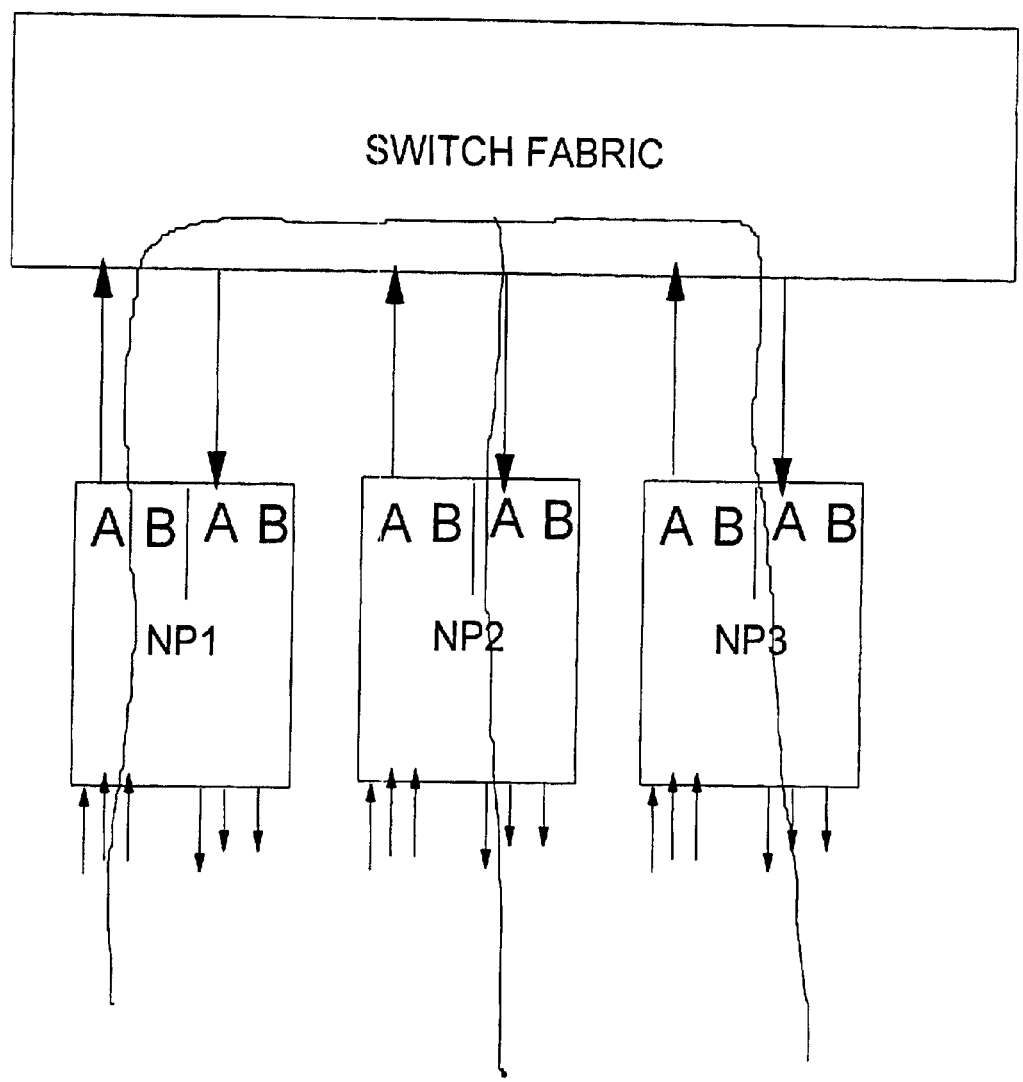
FIG. 8 shows the switching system configuration of FIG. 7 including a single switch fabric and networking processors according to the invention and illustrates the multicast data flow.

FIG. 8 shows the multicast data flow supported by the networking system configuration of FIG. 7. Multicast traffic is supported by the switch in this case: in case of multicast traffic arriving at one input port of NP1 and reaching the switch fabric via the NP1 A UP-PSI, the traffic is duplicated to the down sides of the two network processors. The fact that multicast traffic is supported by the switch and not by the data steering function is known by the data steering function via the parameters about configuration which will be further described with the logic of FIG. 17

Figure 9:
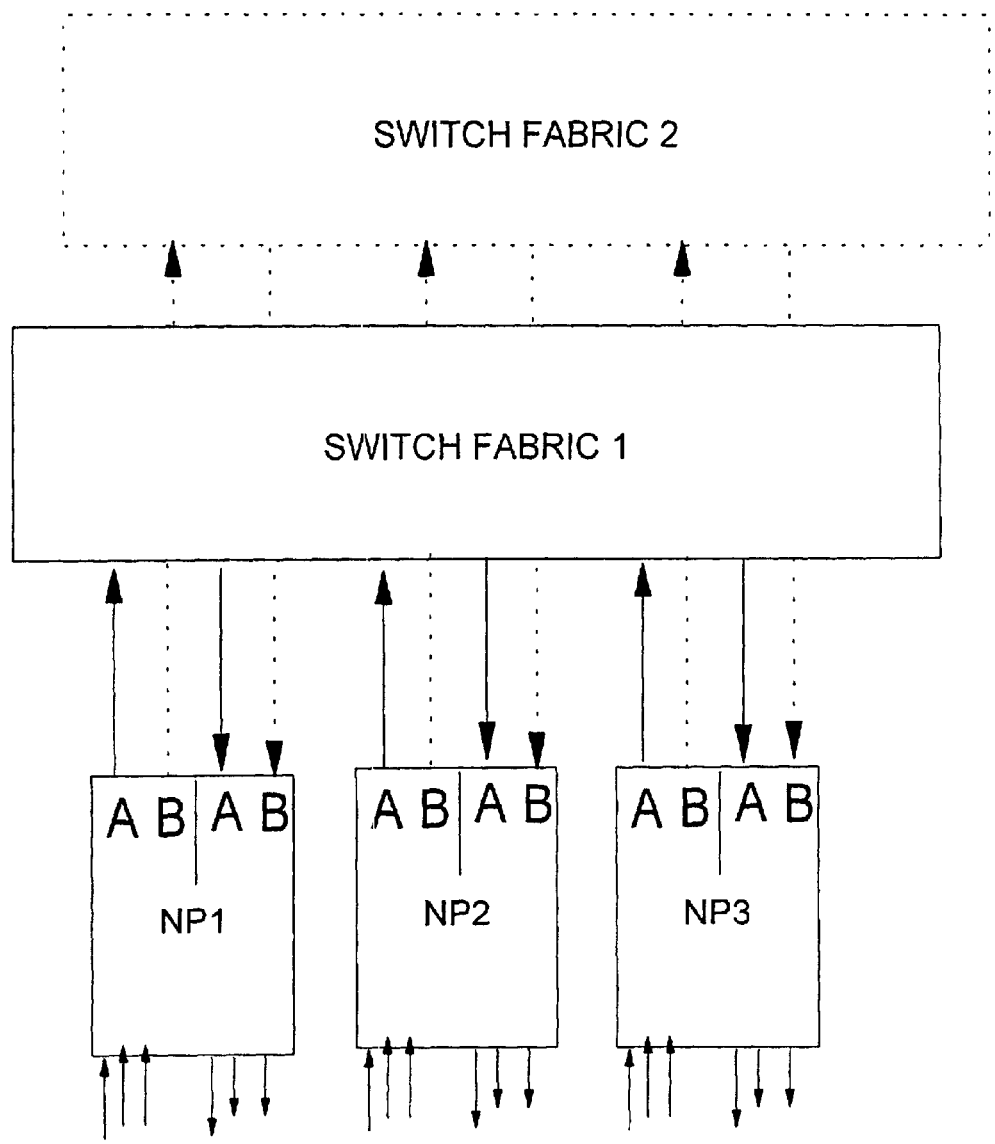
FIG. 9 shows a switching system configuration including two redundant switch fabrics and networking processors according to the invention.

FIG. 9 shows a switching system configuration including two redundant switch fabrics and network processors of the preferred embodiment connected to them. It is noted that the number of network processors or blades with two network processors attached to a switch fabric is never defined. The number used in the figures is just to illustrate the principle. In actual embodiments, the number of network processor blades will depend on the capacity of the switch fabric(s) as for the number of attachments and the throughput which it can sustain. In FIG. 9 switch fabric 2 and its attachment to the network processors are represented in dotted line for the use of the alternate traffic, switch fabric 2 being the alternate switch to which the primary traffic will be transferred in case of failure. Switch fabric 1 and its attachments to the network processors are represented in full line as supporting the primary traffic, switch fabric 1 being the primary switch. In this configuration, the four PSI bus connections interface are used in both direction for connection to the switches.

Figure 10:
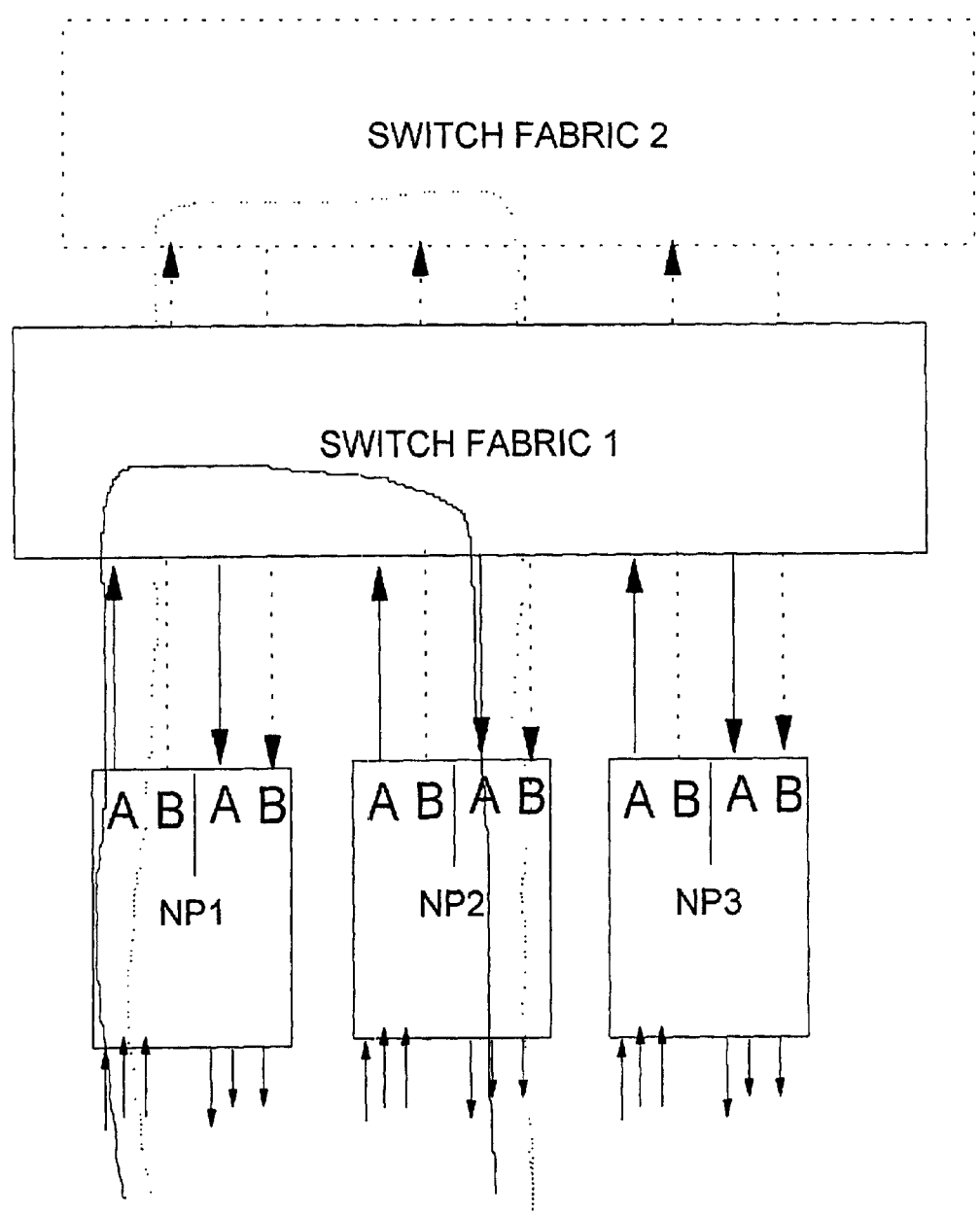
FIG. 10 shows the network processor to network processor data flow for the switching system configuration of FIG. 9 including two redundant switch fabrics and networking processors according to the invention.

FIG. 10 shows the network processor to network processor unicast data flow for the networking system configuration of FIG. 9. As one switch fabric is active at a time, the data flow is the same than for the configuration of unique switch represented in FIG. 8. In dotted line is represented the unicast data flow when the redundant switch fabric is in use. These two data flows are exclusive. The multicast traffic is duplicated by the switch which is active onto the different down attachment to the control processors similarly to the illustration of FIG. 8.

Figure 11:
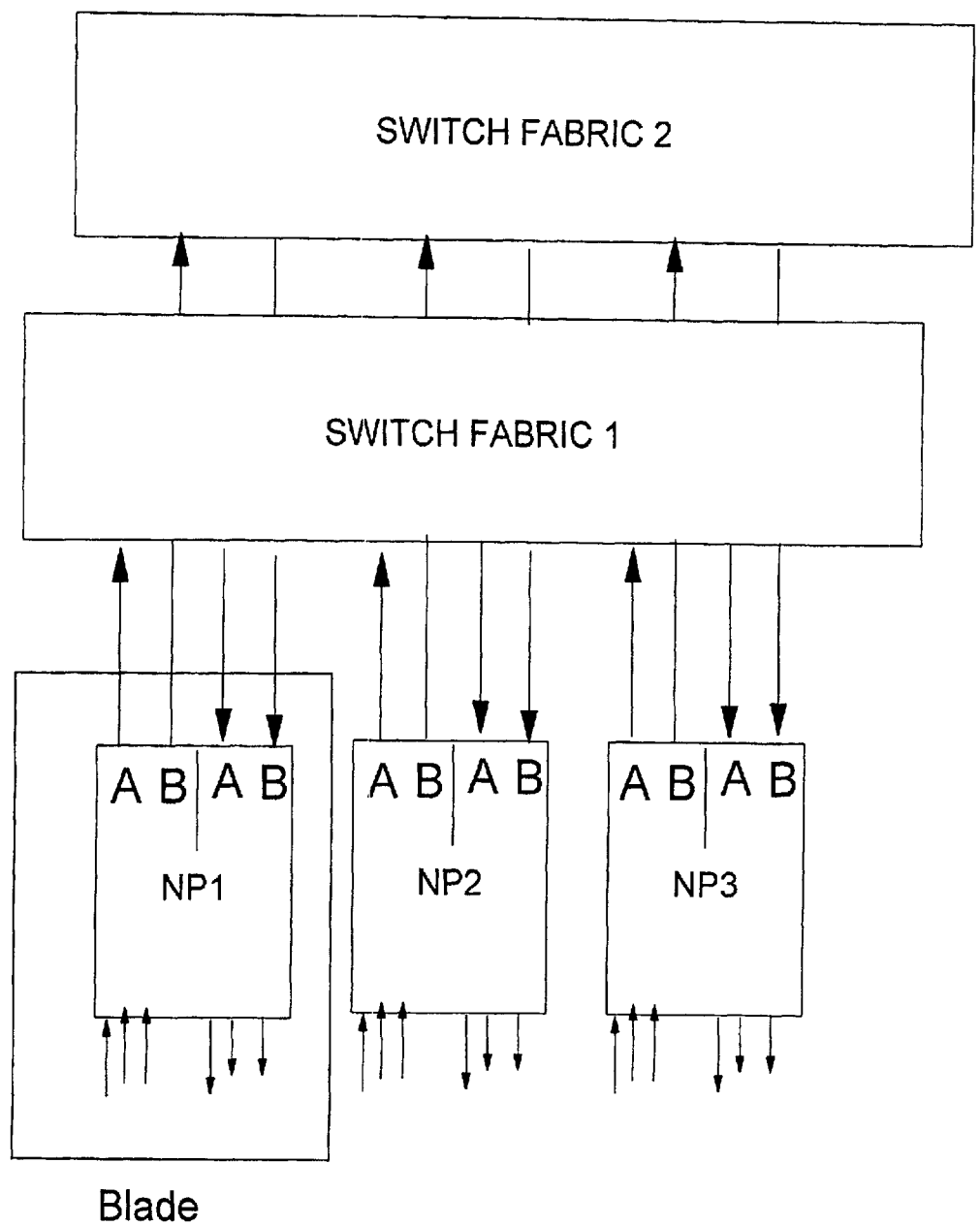
FIG. 11 shows a single switch fabric configuration including the network processors of the invention using the local short cut function.

In FIG. 11 the switching system configuration comprises two switches to which are connected independent network processors. The illustration of a blade is the most probable implementation in the case with single network processor blade. The network processor of the preferred embodiment allows concurrent connection of the network processors to the switch fabrics. On the contrary to the redundant configuration of FIGS. 9 and 10, the traffic entering from one input port of a up side of a network processor always goes to the switch fabric and is sent back to one other down side of one of the attached network processors. As for the multicast traffic, the switches perform the duplication of data on more than one network controller B side.

Figure 12:
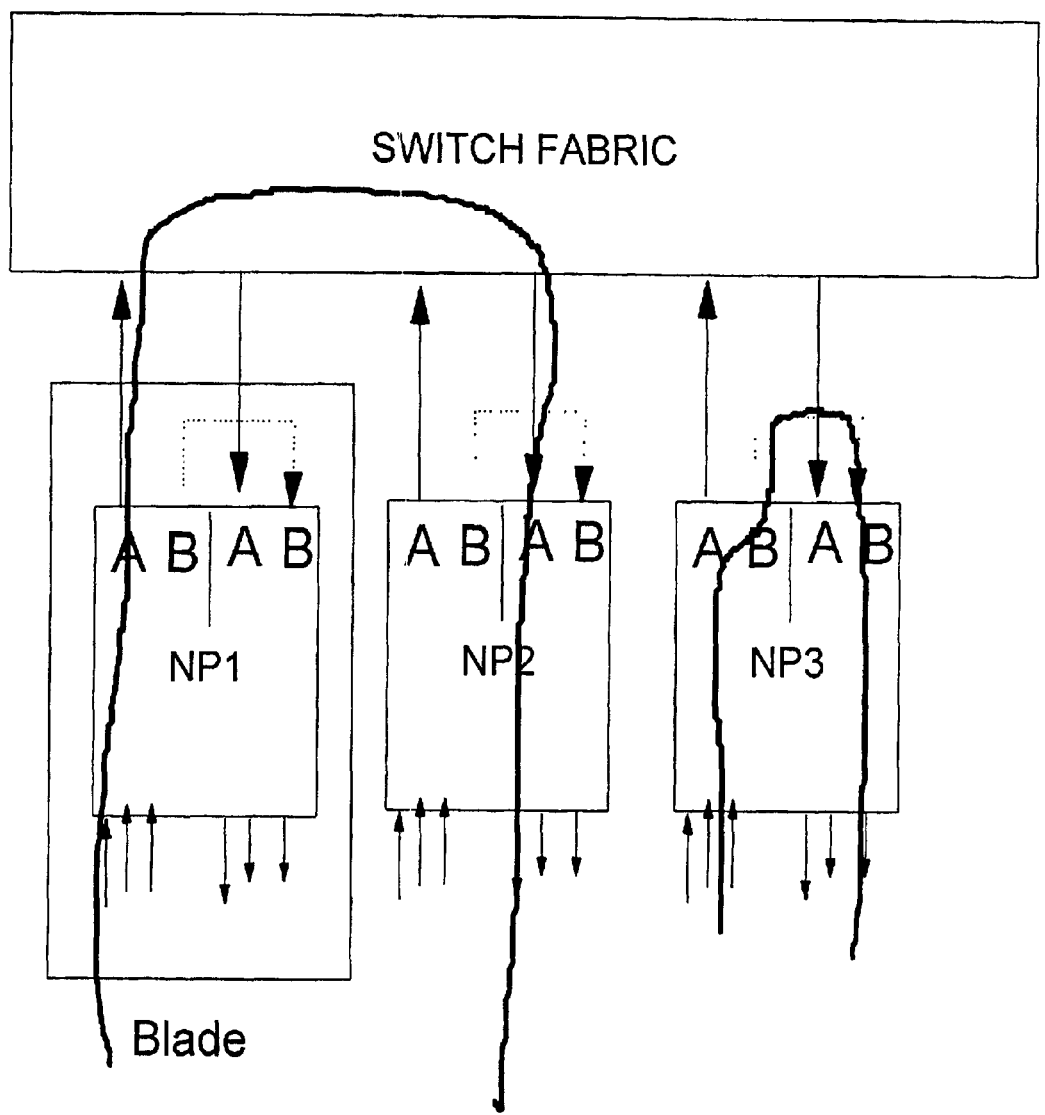
FIG. 12 shows a single switch fabric configuration including the network processors of the invention using the local short cut function.

In the switching configuration of FIG. 12, there is only one switch fabric connected to independent network processors. Each network processor can be set on one blade of a blade based switching box as illustrated by the blade of NP1. If the A up side connections of these network processors are connected to the switch bus, the B up side interface are externally wrapped to the B down side of each network processor. Consequently, if an incoming traffic arriving to the input ports of a network processor has to be sent to an output port of one other network processor, the traffic is sent via the A up side interface to the switch which will perform the switching of that traffic to the A up side interface of the corresponding network processor. The data flows represented in this same figure is illustrating the use of the connections to the switch fabric and the external wrap. A data traffic entering the input ports of NP3, as its destination requires it must be sent to one one of the output ports of NP3 is not sent to the switch but is rather wrapped to the B interface connection of NP3. On the contrary the data traffic entering one input port of NP1 and which has to reach an output port of NP2 will be sent through the A up interface of NP1 towards the switch which will switch the data to the A down interface of NP2 and will reach the target output port.

The multicast data flow in the configuration of FIG. 12 is handled by the network processor receiving it or by the switch depending on the destination. The multicast traffic entering an input port of NP1 needing to reach both one output port of NP1 and output ports of NP2 and NP3 will be duplicated by NP1 and sent both to the external wrap from the B up side of NP1 to the B down side of NP1 and will be sent to the switch thru the A up side interface of NP1. The switch will perform the multicast of the data flow to A down sides of NP2 and NP3.

Figure 13:
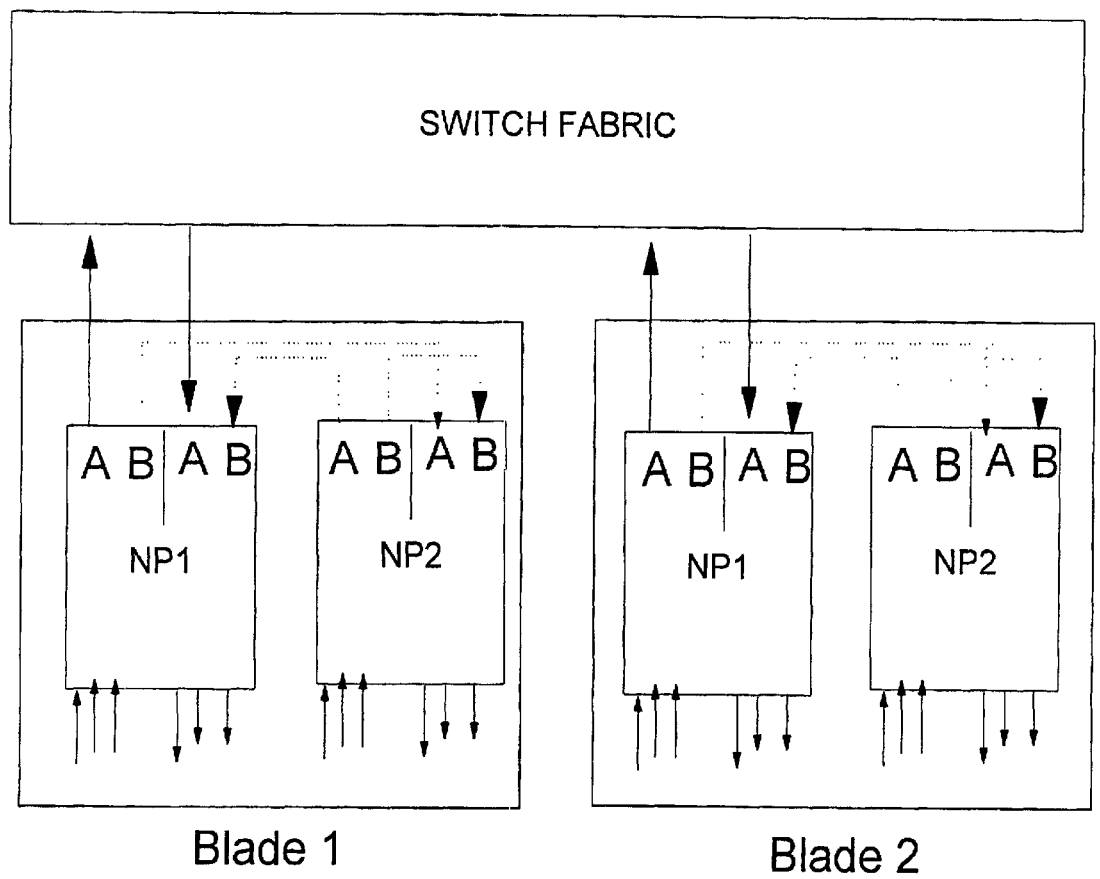
FIG. 13 shows a single switch fabric configuration including network processors forming double density blades.

FIG. 13 shows a switching system comprising a switch fabric and double density blades connected to the switch fabric. The double density blades are formed by two control processors: one basic network processor, connected to the switch via the A up and down interfaces and one extension network processor connected to the first network processor through the A and B up and down interfaces. The extension network processor is not connected to the switch. Between the basic and extension network processors the connection are external wraps as already used in other configurations. This configuration has the advantage of providing high port density blades while using for each only one attachment to the switching fabric.

Basic to basic data flow is handled as follows: Data flow entering an input port of a basic network processor going to an output port of the same or one other basic network processor of one other blade, will first reach the switch through its A up side interface; the switch then will switch the data to the A down side interface of the same basic network processor or to the A down side interface of the basic network processor of the other target blade.

Basic to local extension data flow is handled as follows: Data flow entering an input port of a basic network processor going to an output port of its extension network processor will use the B up side interface of the basic network processor to reach the B down side interface of its extension network processor on the same blade.

Figure 14:
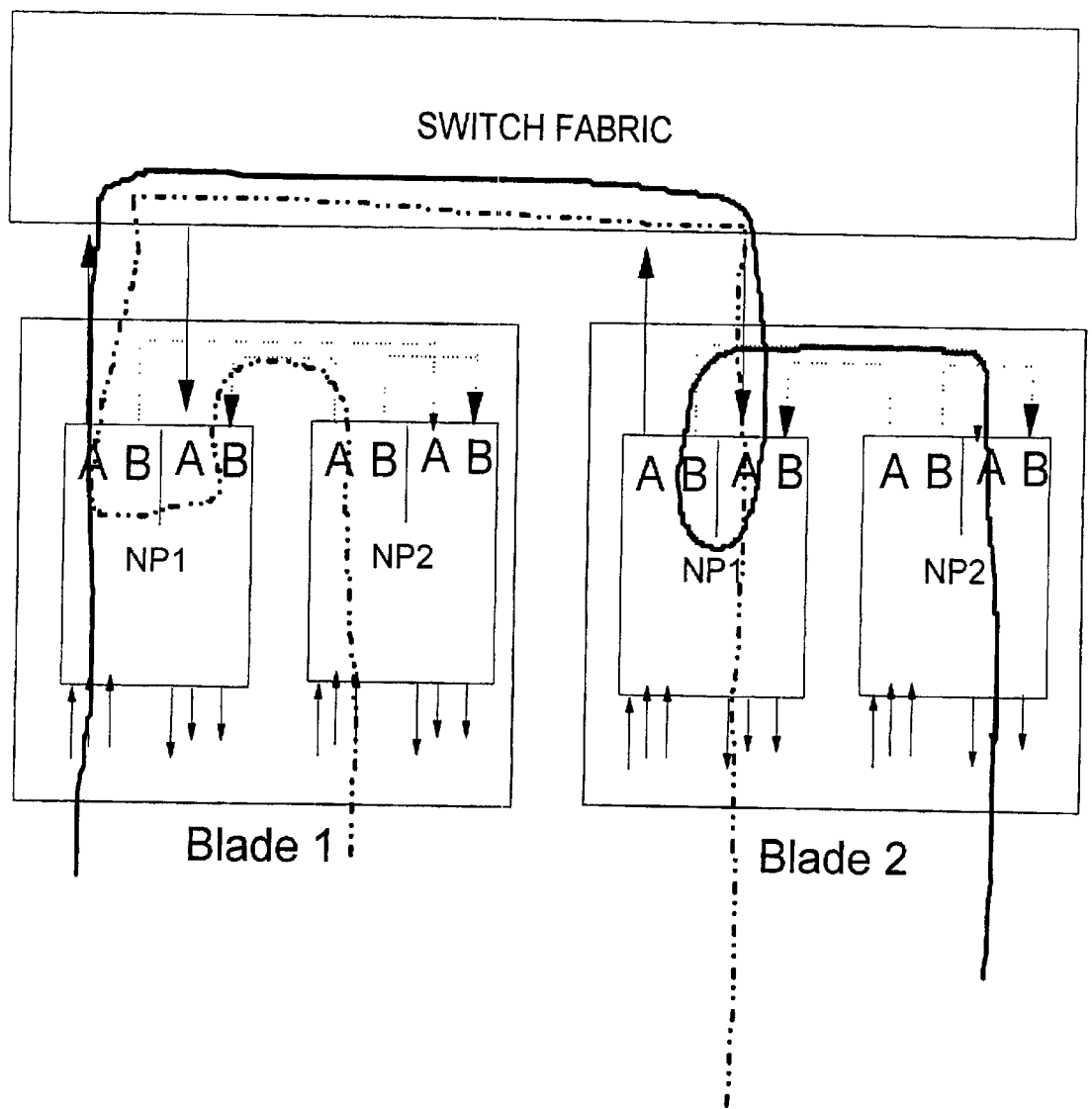
FIG. 14 shows two data flows in the configuration including network processors forming double density blades.

Basic to remote extension of data flow is illustrated by the full line data flow of FIG. 14. It is handled as follows: Data flow entering an input port of a basic network processor going to an output port of one extension work processor of one other blade, will first reach the switch through its A up side interface; the switch then will switch the data to the A down side interface of the basic network processor of the target blade. Traffic arriving on the A down side interface of the basic network processor will be internally wrapped to the side of the basic network processor. Then the traffic is steered to the B upside interface of the basic Network processor and using the external wrap, will be sent to the B down side interface of the extension network processor where it will reach the target output port.

Basic to basic traffic is handled as follows: Data flow entering an input port of a basic network processor (NP1 in blade 1 or in blade 2) and going to an output port of the same network processor will always goes to the switch fabric using the A up side and A down side connections.

Extension to local basic data flow is handled as follows: Data flow entering an input port of an extension network processor going to an output port of the basic network processor of the same blade will be steered to the B up side interface of the extension network processor and will reach the B down side interface of its basic network processor through the external wrap.

Extension to remote basic data flow is illustrated by the dotted line data flow of FIG. 14. It is handled as follows: Data flow entering an input port of an extension network processor going to an output port of the basic network processor of one other blade will be steered to the B up side interface of the extension network processor and will reach the B down side interface of its basic network processor through the external wrap. Then, this traffic will be sent to the internal wrap of the up side of the basic network processor. Here the traffic will be steered to the A up side interface of the basic network processor towards the switch fabric. The switch fabric will switch this traffic to the A down side interface of the basic network processor of the target blade where the output port can be reached.

Extension to local extension is handled as follows: Data flow entering an input port of an extension network processor going to one of an output ports is steered to the B up side interface of the extension network processor and will reach the B down side interface through the external wrap.

Extension to remote extension data is handled as follows: Data flow entering an input port of an extension network processor going to an output port of the extension network processor of one other blade will be steered to the A up side interface of the extension network processor and will reach the B down side interface of its basic network processor through the external wrap. Then the traffic will be internally wrapped in the basic network processor to the A up side interface of the basic network processor. The traffic will then reach the switch fabric which will switch it to the A up side interface of the basic network processor of the target blade. The traffic is then internally wrapped to the B up side interface of the basic network processor and steered to the B up side interface of the same basic network processor. The traffic is sent over the external wrap to the A down side interface of the extension network processor to be sent through the target output port.

Figure 15:
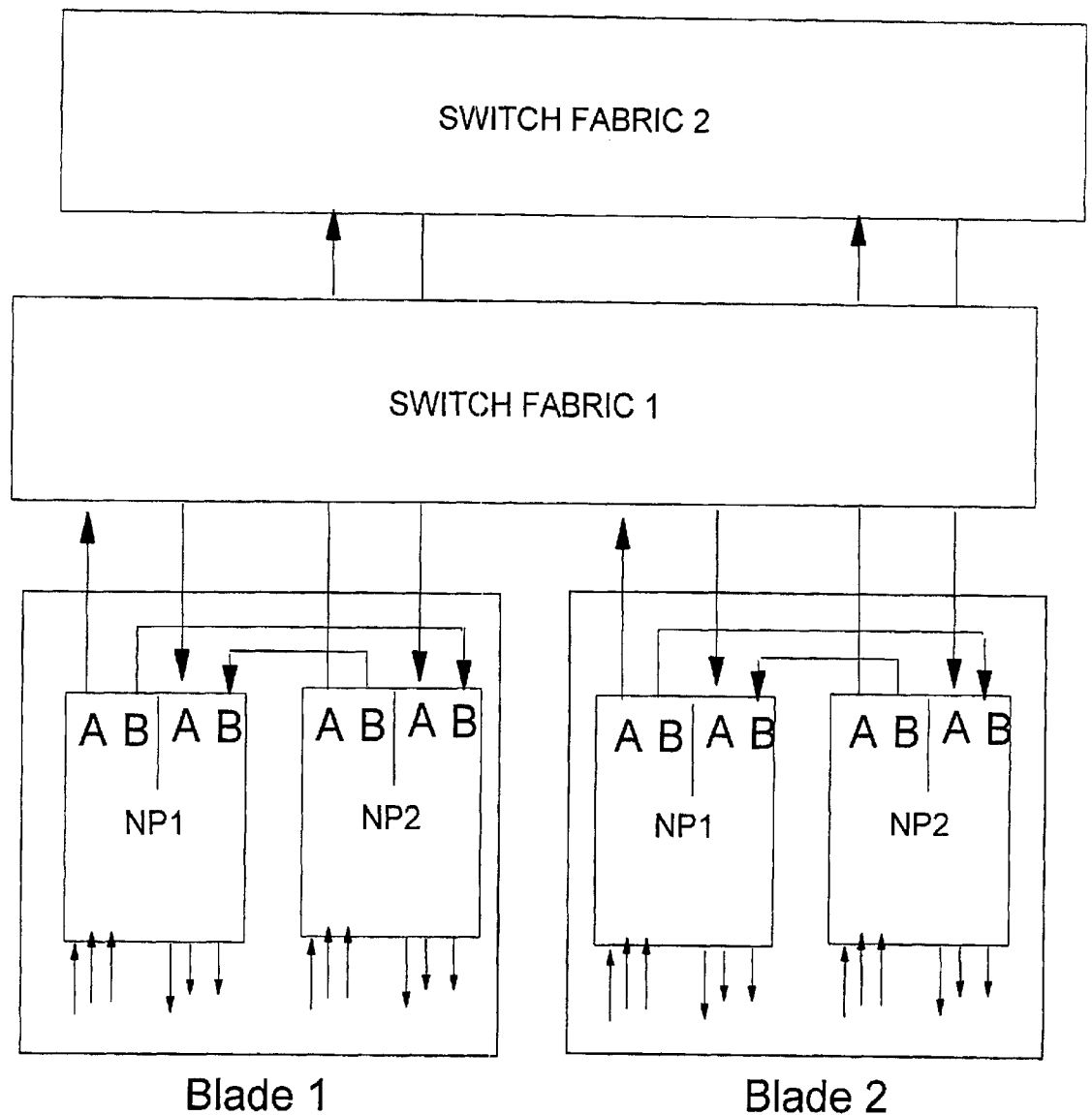
FIG. 15 shows a switching system configuration based on two switch fabrics used for redundancy and accessed concurrently and including double density blades on the network processors of the invention.

FIG. 15 shows a networking system configuration comprising two switch fabrics and two blades attached comprising two network processors of the preferred embodiment. This configuration has the advantage to provide concurrent access to two switches from two double density blades (with a double density configuration different from the double density blades of FIG. 13 having one switch fabric attachment only) and to be full redundant in case of failure of one of the two systems. In the blade the two network processors are symmetrical in their capacity to access the switches. For each blade, the A up and down side interfaces of each network processor is connected to one different switch fabric. Each B up side interface of one network processor of a blade is externally wrapped to the B down interface of the other network processor of the same blade. The various data flows are explained below.

In the following, the first network processor of the blades will be the network processors (NP1) attached to switch fabric 1 in FIG. 15; the second network processor of the blade (NP2) will be the network processors attached to switch fabric in FIG. 15.

First to second local network processor data flow is handled as follows: Data flow entering an input port of a first network processor going to an output port of the second network processor of the same blade will be steered to the B upside interface of the first network processor to the external wrap; this traffic will go to the B down side interface of the second network processor on the same blade to reach the target output port on the second network processor of the blade.

Figure 16:
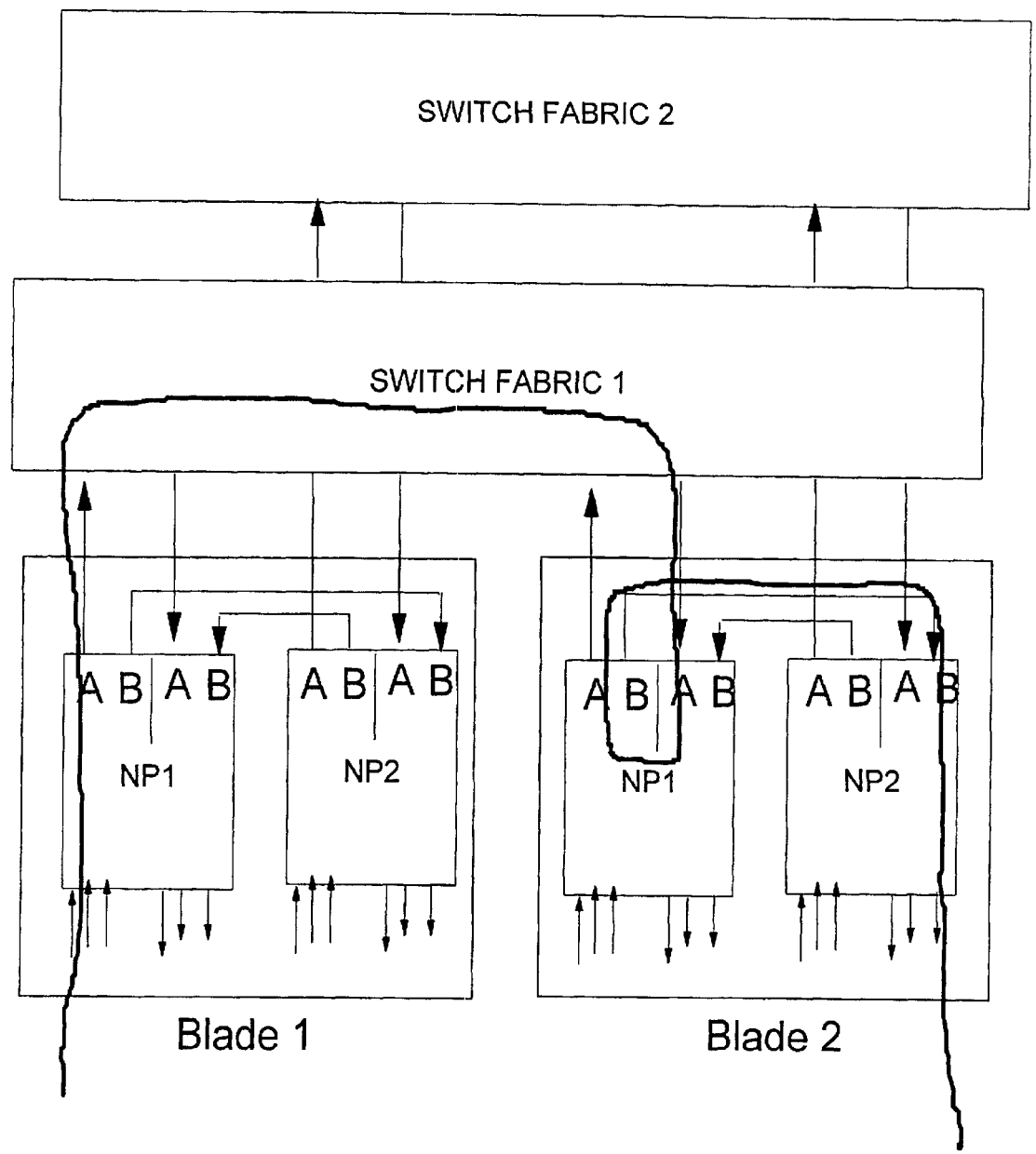
FIG. 16 illustrates the data flows from a basic network processor to a local or remote extension network processor in the switching system configuration of FIG. 13.

First to second remote network processor data flow is illustrated in FIG. 16. This traffic is handled as follows: Data flow entering an input port of the first network processor of the first blade, going to an output port of the second network processor of the other blade will go through switch fabric 1. The traffic is first steered to the A upside interface of the first network processor onto the connection bus to switch fabric 1. Then this traffic is switched by switch fabric 1 to the second blade of the configuration. The traffic is sent to the A down side interface of the first network processor of the second blade; it is internally wrapped to the B up side interface of the first network processor of the second blade to use the external wrap towards the second network processor of the blade. The traffic reaches the B down side interface of the second network processor and is able to be sent on the target output port.

First to first remote network processor data flow is handled as follows: Data flow entering an input port of the first network processor of the first blade, going to an output port of the first will use the switching of switch fabric 1. The traffic is first steered to the A upside interface of the first network processor onto the connection bus to switch fabric 1. Then, this traffic is switched by switch fabric 1 to the second blade of the configuration. The traffic is sent to the A down side interface of the first network processor of the second blade and can access the target output port of the first network processor.

Second to first local network processor data flow is handled as follows: Data flow entering an input port of the first network processor of one blade, going to an output port of the first network processor of the same blade will use the external wrapping to the first network processor. The traffic is first steered to the B upside interface of the second network processor onto the external connection to the B down side interface of the first network processor. The traffic will be sent through the target output port of the first network processor of the blade.

Figure 17:
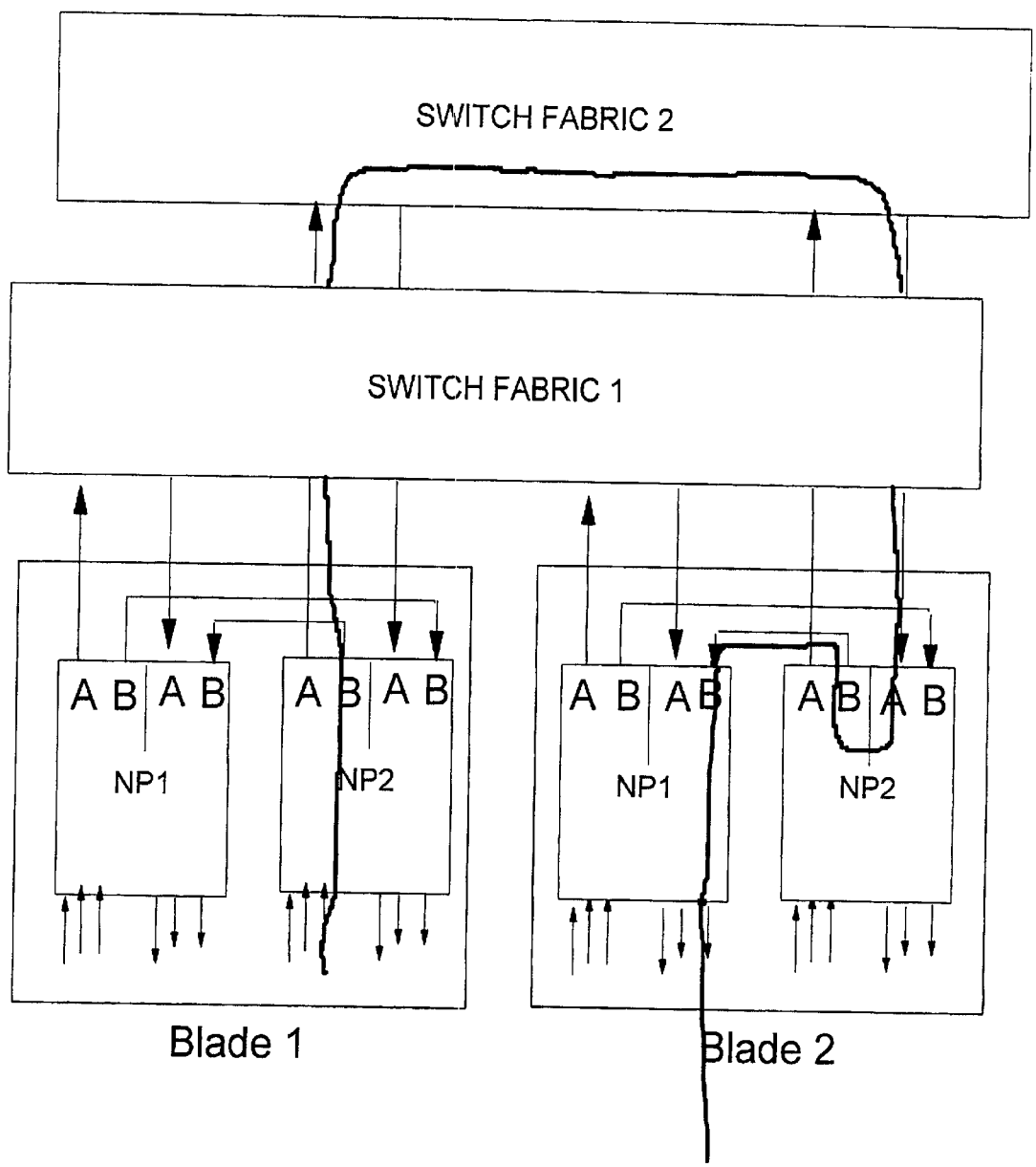
FIG. 17 illustrates the data flows from an extension network processor to a local or remote extension network processor in the switching system configuration of FIG. 13.

Second to first remote network processor data flow is illustrated in FIG. 17. This traffic is handled as follows: Data flow entering an input port of the second network processor of the first blade will be steered to the A up side interface of the second network processor to reach switch fabric 2. Switch fabric 2 switches the traffic to the second blade. The traffic will be sent to the B down side interface of the second network processor of the second blade. The traffic to reach the first network processor of the second blade will be sent through the internal wrap of the second network processor and will reach the up side of the second network processor. The traffic is then sent to the B up side interface of the first network processor of the second blade from where it will reach the target output port.

Second to second remote network processor data flow is handled as follows: Data flow entering an input port of the second network processor of the first blade will be steered to the A up side interface of the second network processor to reach switch fabric 2. Switch fabric 2 switches the traffic to the second blade. The traffic will be sent to the B down side interface of the second network processor of the second blade from where it will reach the target output port.

The redundancy traffic data flow will use the existing internal and external wrapping of the network processors on a same blade. Each time any of a first or second network processor needs to access the switch fabric it is attached to, if the switch fabric is unavailable, the traffic is steered to the second network processor of the same blade via the external wrap connection and the B up side and the B down side respective interfaces of the two network processors.

FIG. 18 illustrates a function, located in the up side of the Network Processor, which decides to which interface, A or B, the traffic will be steered. In the preferred embodiment, the implementation is a hardware logic using elementary hardware logic such as the OR (O), the exclusive or (X), the AND (A) and the inverter (N). In the preferred embodiment, the steering logic uses five input parameters for all the types of switching system configurations that include the network processor (but not necessary a switching fabric). These input parameters are brought to this logic as wired signals. The value and meaning of each parameter depends on the configuration of the switching system and depends on the destination of traffic. Depending also on the configuration and the destination of traffic, all the parameters are not used. A first part of the logic (1800) of FIG. 18 is included in the UP-SDM logic. The second part (1810) is located in the UP-DSA logic, which provide the final data steering decision, and is illustrated in FIG. 19. The logic of UP-SDM (1800), as illustrated in FIG. 18, can use the input of the four parameters IP, IA, TB and OTHER. The use of this logic can be illustrated on the switching system configuration of FIG. 15, FIG. 16 and FIG. 17 providing concurrent access to switch fabric 1 and switch fabric 2 and redundant switching in case of failure of one of the two switches. IP is the request for Primary switch traffic path (switch fabric 1) use and IA is the request for Alternate switch traffic path (switch fabric 2) use. In logic 1800, the values of IP and IA are reversed by the X gates (exclusive OR ) when the target blade destination (second double density blade) is detected as being the local blade and if the destination network processor is the other network processor (OTHER=1). This gives the reversed signals in P and A inputs to the next logic compared to IP and IA. To detect if the target blade is the local blade, the target blade (TB) is compared to the blade steering the traffic (stored in the MYTB register). To cover the multicast traffic, both P and A output signals are forced when a TB destination includes local blade and at least one remote blade (this is the use of the two OR gates). The second logic illustrated in FIG. 19 is for choosing the output connections A or B according to the A and P signals defined by the first logic (1800) and the control input P/A. P/A=0 means that the primary is the switch fabric initial (switch fabric 1) that can be reached by the A output connection. If P=1, this means that primary is selected by the previous logic, the output connection chosen will be A. If A=1, this means that alternate is selected by the previous logic and the output connection selected by logic 1810 is B. Conversely, if P/A=1, this means that the primary is the second switch fabric (switch fabric 2) that can be reached by the B output connection. If P=1, this means that the primary switch is requested and the B output connection is selected by logic 1810. The A output connection will be selected by logic 1810 if the alternate switch is requested by A=1. Both A and B output connections are selected when both primary and alternate paths are requested by P=1 and A=1. The following table displays the values of the parameters according to the configurations illustrated in the different figures. It is noted that, in the case of double density blades with one switch (FIG. 13 and FIG. 14), the OTHER parameter is set to 1 this means that the destination network processor goes to the extension network processor which is not connected to the switch: this is noted in the table by EXTENSION instead of OTHER. This same parameter when used with wrap connection means internal or external WRAP. This is used in some data traffic flows for FIG. 7, FIG. 10 and FIG. 12 as indicated in the table.

| FIG. | P/A | IP | IA | TB | OTHER | Direction |
|------|-----|----|----|----|-------|-----------|
| 4A | A | 1 | 0 | NE | 0 | A |
| 4B | B | 1 | 0 | NE | 0 | B |
| 5A | A | 1 | 0 | NE | 0 | A |
| 5B | B | 1 | 0 | NE | 0 | B |
| 5B | B | 1 | 0 | NE | 0 | A |
| 6 | B | 1 | 0 | E & NE | 0 | A |
| 7 | A | 1 | 0 | NE | 0 wrap | A |
| 7 | A | 1 | 0 | E | 0 wrap | A |
| 8 | A | 1 | 0 | E & NE | 0 | A & B |
| 10 | A | 1 | 0 | NE | 0 wrap | A |
| 10 | A | 1 | 0 | E | 0 wrap | A |
| 10 | B | 1 | 0 | NE | 0 wrap | B |
| 10 | B | 1 | 0 | E | 0 wrap | B |
| 11 | A | 1 | 0 | E or NE | 0 | A |
| 11 | A | 0 | 1 | E or NE | 0 | B |
| 11 | B | 1 | 0 | E or NE | 0 | B |
| 11 | B | 0 | 1 | E or NE | 0 | A |
| 12 | A | 1 | 0 | NE | 0 wrap | A |
| 12 | A | 1 | 0 | E | 0 wrap | B |
| 14 NP1 | A | 1 | 0 | NE | 1 extension | A |
| 14 NP2 | A | 1 | 0 | NE | 0 extension | A |
| 13 | A | 1 | 0 | E | 0 extension | A |

-continued

| FIG. | P/A | IP | IA | TB | OTHER | Direction |
|---|---|---|---|---|---|---|
| 13 | A | 1 | 0 | E | 1 extension | B |
| 16 NP1 | A | 1 | 0 | NE | 1 | A |
| 16 NP1 Blade 1 | A | 1 | 0 | E | 1 | A |
| 16 NP2 Blade 1 | A | 1 | 0 | NE | 1 | A |
| 17 Blade 1 | A | 1 | 0 | E | 0 | A |
| 15 | A | 1 | 0 | E | 0 | A |
| 15 | A | 1 | 0 | NE | 0 | A |
| 15 | B | 1 | 0 | E | 0 | B |
| 15 | B | 1 | 0 | NE | 0 | A |
| 15 | B | 1 | 0 | E | 1 | A |
| 15 | B | 1 | 0 | NE | 1 | B |

A hardware logic simpler than the hardware logic of FIG. 18 is preferably used to implement the down side steering function of the network processor. The internally formatted data units arriving at the down side connection bus interface can be sent to the buffers of the network processor storage units for being reformatted and sent to one output port of the same down side. However, depending on the configuration, the internally formatted data units can be also buffered for being steered by the up side of the same network processor (internal wrap) to one of the two up bus connections A or B. The configuration and destination parameters are used by the DN-SDM function which will compute the P and A parameters. The DN-DSA function steers the traffic to the UP-DSA function upon the value of the parameters. In FIG. 13, traffic arriving at a down side bus connection of the basic network processor (NP1) of the first blade and going to the same network processor will be sent to the output ports of the same down side of the network processor. If the destination is the extension network processor, this traffic will be sent to the up side connection connected to the extension (B in FIG. 13). If the destination is not the basic network processor (NP1) of the same target blade, the traffic is steered to the up side bus connection connected to the switch (A bus connection in FIG. 13). In FIG. 15, FIG. 16, FIG. 17 illustrating a switching system configuration with double density blades and two switch fabrics, if data traffic is received on the down side bus connection from the switch (A bus connection in the cited figures), and if traffic destination is the other network processor of the double density configuration, the traffic is steered to the up side of the same network processor. In the other cases, the traffic is processed by the lower layers in the same down side of the network processor.

What is claimed is:

1. A network apparatus comprising:
   storage units, mounted on the board, storing configuration information about the network apparatus;
   an input network interfaces mounted on the board, to couple to at least one network physical line;
   at least one processor, mounted on the board, receiving network data from said input network interface, processing said data, storing information about said network data in said storage units, storing said data as formatted data units in said storage units;
   a first bus interfaces to two bus connections;
   a first hardware component reading said configuration information and said information about data stored in said storing units and steering said formatted data units stored in said storage units to at least one of the two bus connections of said first bus interface;
   a second bus interface to two bus connections;
   an output network interface to at least one network physical line; and
   a second hardware component reading formatted data units arriving on at least one of the two bus connections of said second bus interface and storing said formatted date units in said storage units, said at least one processor reading said formatted data units from said storage units, processing them and sending them as network data to at least one network physical line through said output network interface.

2. The network apparatus of claim 1 further comprising:
   a bus connecting one of the two bus connections of said first bus interface to one of the two bus connections of said second bus interface, the first hardware component of said network apparatus sending formatted data units to said bus and the second hardware component receiving from said bus said formatted data units.

3. The network apparatus of claim 2,
   wherein the second hardware component further comprises an additional storage unit and additional logic for reading said configuration information and said information about data stored in said storing units and steering said read formatted data units either to said storage units or to said additional storage unit; and
   wherein, the first hardware component further comprises a bus accessing said additional storage unit, said first hardware component steering said formatted data units stored in said additional storage unit to at least one of the two bus connections of said first bus interface.

4. A switching system comprising:
   a network apparatus according to claim 3;
   a second network apparatus according to claim 2;
   a second bus connecting the second one of the two bus connections of said second bus interface of said first network apparatus to the second one of the two bus connections of said first bus interface of said second network apparatus, said second bus conveying data received at the network interface of said first network processor said data being intended to be sent to the network interface of said second network processor;
   a third bus connecting the second one of the two bus connections of said first bus interface of said second network apparatus to the second one of the two bus connections of said second bus interface of said first network apparatus, said third bus conveying data having been sent through said second bus but being intended to be sent through said bus to said additional memory, to the network interface of said first network processor.

5. A blade comprising:
   a circuit board;
   a network apparatus according to claim 3 mounted on the board;
   a second network apparatus according to claim 2 mounted on the board;
   a second bus, mounted on the board, connecting the second one of the two bus connections of said second bus interface of said first network apparatus to the second one of the two bus connections of said first bus interface of said second network apparatus, said second bus conveying data received at the network interface of said first network processor said data being intended to be sent to the network interface of said second network processor;

a third bus, mounted on the board, connecting the second one of the two bus connections of said first bus interface of said second network apparatus to the second one of the two bus connections of said second bus interface of said first network apparatus, said third bus conveying data having been sent through said second bus but being intended to be sent through said bus to said additional memory, to the network interface of said first network processor.

6. A switching system comprising:

a switching fabric receiving formatted data units from at least one input bus connection and switching said formatted data units to at least one output bus connection;

a second switching fabric receiving formatted data units from at least one input bus connection and switching said formatted data units to at least one output bus connection;

a first network apparatus according to claim 3;

a second network apparatus according to claim 3;

a first bus connecting one of the two bus connections of said first bus interface of said first network apparatus to one of the at least one input bus connection of said switching fabric, said first bus conveying formatted data units sent by said first network apparatus to said first switching fabric;

a second bus connecting one of the two bus connections of said second bus interface of said first network apparatus to one of the at least one output bus of said switching fabric, said second bus conveying formatted data units sent by said first switching fabric to said first network apparatus;

a third bus connecting one of the two bus connections of said first bus interface of said second network apparatus to one of the at least one input bus connection of said second switching fabric, said third bus conveying formatted data units sent by said second network apparatus to said second switching fabric;

a fourth bus connecting one of the two bus connections of said second bus interface of said first network apparatus to one of the at least one output bus of said switching fabric, said second bus conveying formatted data units sent by said switching fabric to said first network apparatus;

a fifth bus connecting the second one of the two bus connections of said first interface of said first network apparatus to the second one of the two bus connections of the second interface of said second network apparatus; and a sixth bus connecting the second one of the two bus connections of said first interface of said second network apparatus to the second one of the two bus connections of the second interface of said first network apparatus.

7. The network apparatus of claim 2 wherein the recited elements are formed on a common semiconductor substrate.

8. A switching system comprising:

a switching fabric receiving formatted data units from at least one input bus connection and switching said formatted data units to at least one output bus connection;

a first network apparatus according to claim 7;

a second network apparatus according to claim 1;

a second bus connecting one of the two bus connections of said first bus interface of said first network apparatus to one of the at least one input bus connection of said switching fabric, said second bus conveying formatted data units sent by said network apparatus to said switching fabric;

a third bus connecting one of the two bus connections of said second bus interface of said network apparatus to one of the at least one output bus of said switching fabric, said third bus conveying formatted data units sent by said switching fabric to said network apparatus;

a fourth bus connecting the second one of the two bus connections of said second bus interface of said first network apparatus to the second one of the two bus connections of said first bus interface of said second network apparatus, said fourth bus conveying data received at the network interface of said first network processor said data being intended to be sent to the network interface of said second network processor; and a fifth bus connecting the second one of the two bus connections of said first bus interface of said second network apparatus to the second one of the two bus connections of said second bus interface of said first network apparatus, said fifth bus conveying data having been sent through said second bus but being intended to be sent through said bus to said additional memory, to the network interface of said first network processor.

9. A switching system comprising:

a switching fabric receiving formatted data units from at least one input bus connection and switching said formatted data units to at least one output bus connection, at least one network apparatus according to claim 2, each network apparatus further comprising:

a second bus connecting the second one of the two bus connections of said first bus interface of said network apparatus to one of the at least one input bus connection of said switching fabric, said first bus conveying formatted data units sent by said network apparatus to said switching fabric;

a third bus connecting the second one of the two bus connections of said second bus interface of said network apparatus to one of the at least one output bus of said switching fabric, said second bus conveying formatted data units sent by said switching fabric to said network apparatus.

10. The network apparatus of claim 1, wherein the second hardware component further comprises an additional storage unit and additional logic for reading said configuration information and said information about data stored in said storing units and steering said read formatted data units either to said storage units or to said additional storage unit; and wherein the first hardware component further comprises a bus accessing said additional storage unit, said first hardware component steering said formatted data units stored in said additional storage unit to at least one of the two bus connections of said first bus interface.

11. The network apparatus of claim 10 wherein the recited elements are formed on a common semiconductor substrate.

12. The network apparatus of claim 1 wherein the recited elements are formed on a common semiconductor substrate.

13. A switching system comprising:

a switching fabric receiving formatted data units from at least one input bus connection and switching said formatted data units to at least one output bus connection;

at least one network apparatus according to claim 1;

said switching system further comprising;

a first bus connecting one of the two bus connections of said first bus interface of said network apparatus to one of the at least one input bus connection of said switching fabric, said first bus conveying formatted data units sent by said network apparatus to said switching fabric;

a second bus connecting one of the two bus connections of said second bus interface of said network apparatus to one of the at least one output bus of said switching fabric, said second bus conveying formatted data units sent by said switching fabric to said network apparatus.

14. The switching system of claim 13 further comprising:

a second switching fabric receiving formatted data units from at least one input bus connection and switching said formatted data units to at least one output bus connection;

said switching system further comprising:

a third bus connecting the second of the two bus connections of said first bus interface of said network apparatus to one of the at least one input bus connection of said second switching fabric, said third bus conveying formatted data units sent by said network apparatus to said second switching fabric;

a fourth bus connecting the second one of the two bus connections of said second bus interface of said network apparatus to one of the at least one output bus of said second switching fabric, said fourth bus conveying formatted data units sent by said second switching fabric to said network apparatus.

15. A blade comprising:

a circuit board;

storage units mounted on the board, storing configuration information about the network apparatus;

an input network interface mounted on the board, to connect to at least one network physical line;

at least one processor mounted on the board, receiving network data from said input network interface, processing said data, storing information about said network data in said storage units, storing said data as formatted data units in said storage units;

a first bus interface mounted on the board, to connect to two bus connections;

a first hardware component mounted on the board, to read said configuration information and said information about data stored in said storing units and steering said formatted data units stored in said storage units to at least one of the two bus connections of said first bus interface;

a second bus interface mounted on the board, to connect to two bus connections;

an output network interface mounted on the board, to connect to at least one network physical line;

a second hardware component mounted on the board, reading formatted data units arriving on at least one of the two bus connections of said second bus interface and storing said formatted data units in said storage units, said at least one processor reading said formatted data units from said storage units, processing them and sending them as network data to at least one network physical line through said output network interface.

16. A blade comprising:

a circuit board;

storage units mounted on the board, storing configuration information about a network apparatus;

an input network interface mounted on the board, to connect to at least one network physical line;

at least one processor mounted on the board, receiving network data from said input network interface, processing said data, storing information about said network data in said storage units, storing said data as formatted data units in said storage units;

a first bus interface mounted on the board, to connect to two bus connections;

a first hardware component mounted on the board, said first hardware component reading said configuration information and said information about data stored in said storing units and steering said formatted data units stored in said storage units to at least one of the two bus connections of said first bus interface;

a second bus interface mounted on the board, to connect to two bus connections, wherein the second hardware component further comprises an additional storage unit, mounted on the board, and an additional logic, mounted on the board, for reading said configuration information and said information about data stored in said storing units and steering said read formatted data units either to said storage units or to said additional storage unit, wherein, the first hardware component further comprises a bus, mounted on the board, accessing said additional storage unit, said first hardware component steering said formatted data units stored in said additional storage unit to at least one of the two bus connections of said first bus interface.

17. A blade comprising:

a circuit board;

storage units, mounted on the board, storing configuration about the network apparatus;

an input network interface, mounted on the board, to couple to at least one network physical line;

at least one processor, mounted on the board, receiving network data from said input network interface, processing said data units in said storage units; storage units, storing said data as formatted data units in said storage units;

a first bus interface, mounted on the board, to couple to two bus connections, a first hardware component, mounted on the board reading said configuration information and said information about data stored in said storing units and steering said formatted data units stored in said storage units to at least one of the two bus connections of said first bus interface;

a second bus interface, mounted on the board, to couple to two bus connections;

a bus, mounted on the board, connecting one of the two bus connections of said first bus interface to one of the two bus connections of said second bus interface, the first hardware component of said network apparatus sending formatted data units to said bus and the second hardware component receiving from said bus said formatted data units.

18. A blade comprising:

a circuit board;

storage units, mounted on the board, storing configuration about a network apparatus;

an input network interface, mounted on the board, to couple to at least one network physical line;

at least one processor, mounted on the board, receiving network date from said input network interface, processing said data, storing information about said network data in said storage units, storing said data as formatted data units in said storage units;

a first bus interface, mounted on the board, to couple to two bus connections;

a first hardware component, mounted on the board;

reading said configuration information and said information about data stored in said storing units and steering said formatted data units stored in said storage units to at least one of the two bus connections of said first bus interface;

a second bus interface mounted on the board, to connect to two bus connections;

a bus, mounted on the board, connecting one of the two bus connections of said first bus interface to one of the two bus connections of said second bus interface, the first hardware component of said network apparatus sending formatted data units to said bus and the second hardware component receiving from said bus said formatted date units, wherein the second hardware component further comprises an additional storage unit, mounted on the board, and an additional logic, mounted on the board, for reading said configuration information and said information about data stored in said storing units and steering said read formatted data units either to said storage units or to said additional storage unit, wherein, the first hardware component further comprises a bus, mounted on the board, accessing said additional storage unit, said first hardware component steering said formatted data units stored in said additional storage unit to at least one of the two bus connections of said first bus interface.

* * * * *